(12) United States Patent
Nakahira

(10) Patent No.: US 6,879,783 B1
(45) Date of Patent: Apr. 12, 2005

(54) NODE DEVICE AND OPTICAL NETWORK SYSTEM

(75) Inventor: Yoshihiro Nakahira, Hachioji (JP)

(73) Assignee: Oki Electric Industry, Co., Ltd., Tokyo (JP)

( * ) Notice: Subject to any disclaimer, the term of this patent is extended or adjusted under 35 U.S.C. 154(b) by 450 days.

(21) Appl. No.: 09/612,371

(22) Filed: Jul. 7, 2000

(30) Foreign Application Priority Data

Jul. 28, 1999 (JP) .......................................... 11-213185

(51) Int. Cl.[7] .............................................. H04J 14/00
(52) U.S. Cl. ............................ 398/51; 398/49; 398/50; 398/54; 398/56; 709/249; 709/250
(58) Field of Search ............................... 398/49–51, 54, 398/56, 58; 709/249, 250; 370/352, 355–356; 359/110, 117, 123, 128, 139; 714/4

(56) References Cited

U.S. PATENT DOCUMENTS 5,303,078 A * 4/1994 Brackett et al. ............ 359/139
5,956,165 A * 9/1999 Fee et al. .................... 359/118
6,535,313 B1 * 3/2003 Fatehi et al. ................. 359/139
2003/0145246 A1 * 7/2003 Suemura ........................ 714/2

* cited by examiner

Primary Examiner—Kinfe-Michael Negash
(74) Attorney, Agent, or Firm—Venable. LLP; James R. Burdett

(57) ABSTRACT

A method for setting a cut-through optical path in an optical network system is proposed. At first, a destination side edge node device which confirmed,the transfer of a packet to a terminal accommodated by the present node device or to an access system network notifies the open resource information of the present node device to a transmission side edge node device. Then the transmission side edge node device determines the optimum allocation of an optical path to be set on the transfer route based on the open resource information notified by the destination side edge node device and the core node device. Then, according to the allocation optical path determined in the previous step, the transmission side edge node device, the core node device, and the destination side edge node device set the optical path which omits the packet transfer processing (layer 2 and layer 3 processing) in transit nodes.

20 Claims, 20 Drawing Sheets

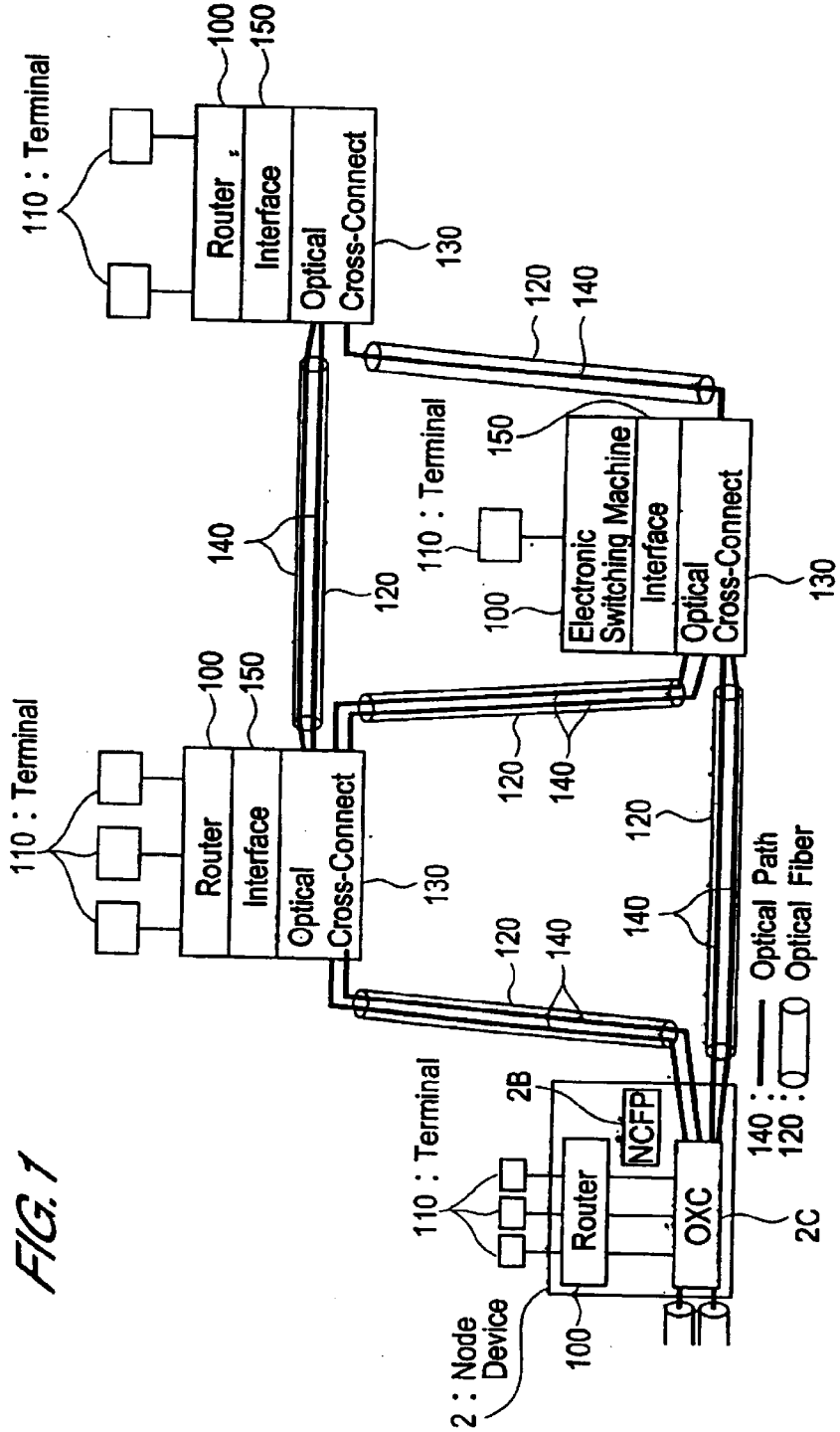

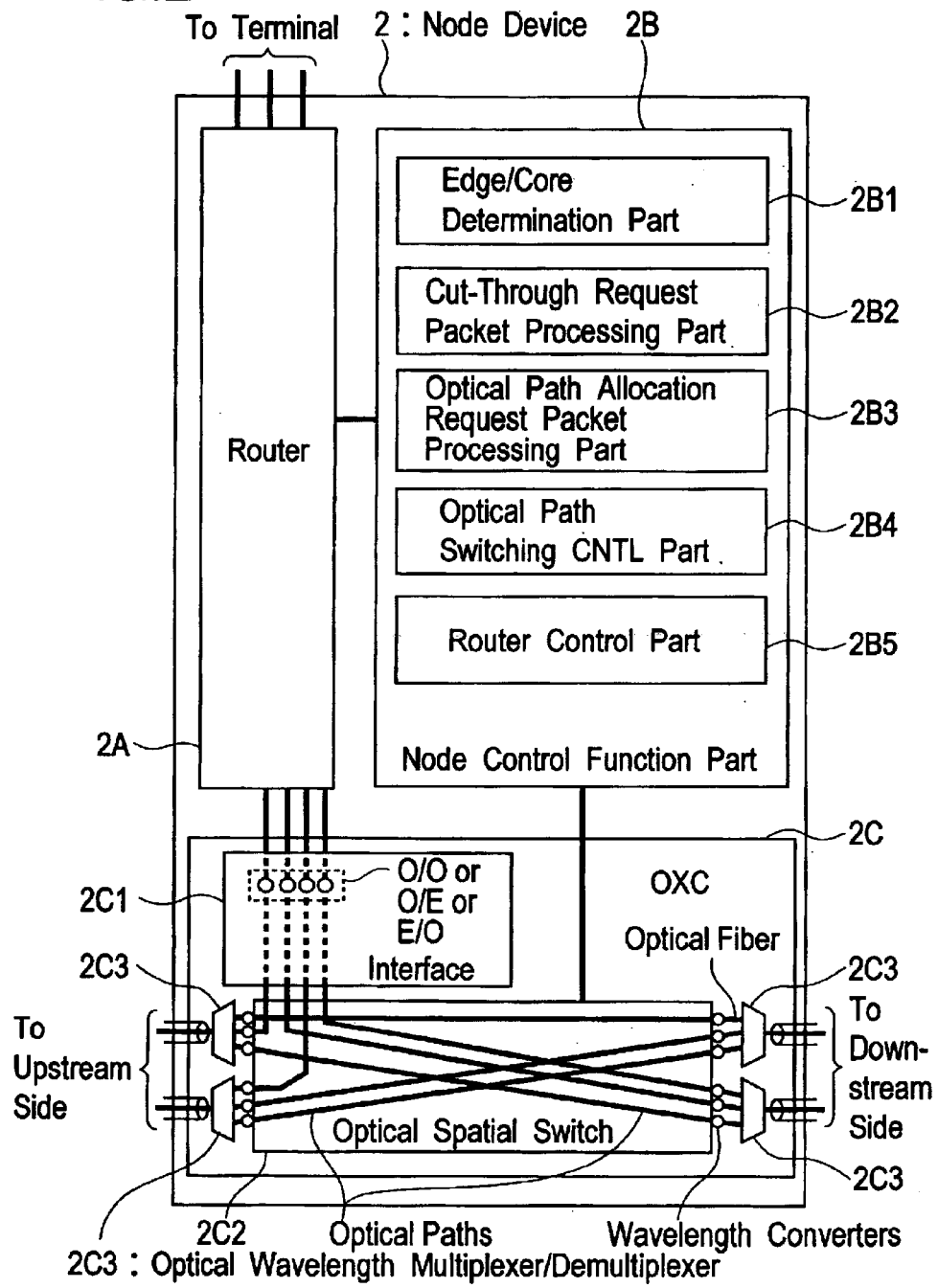

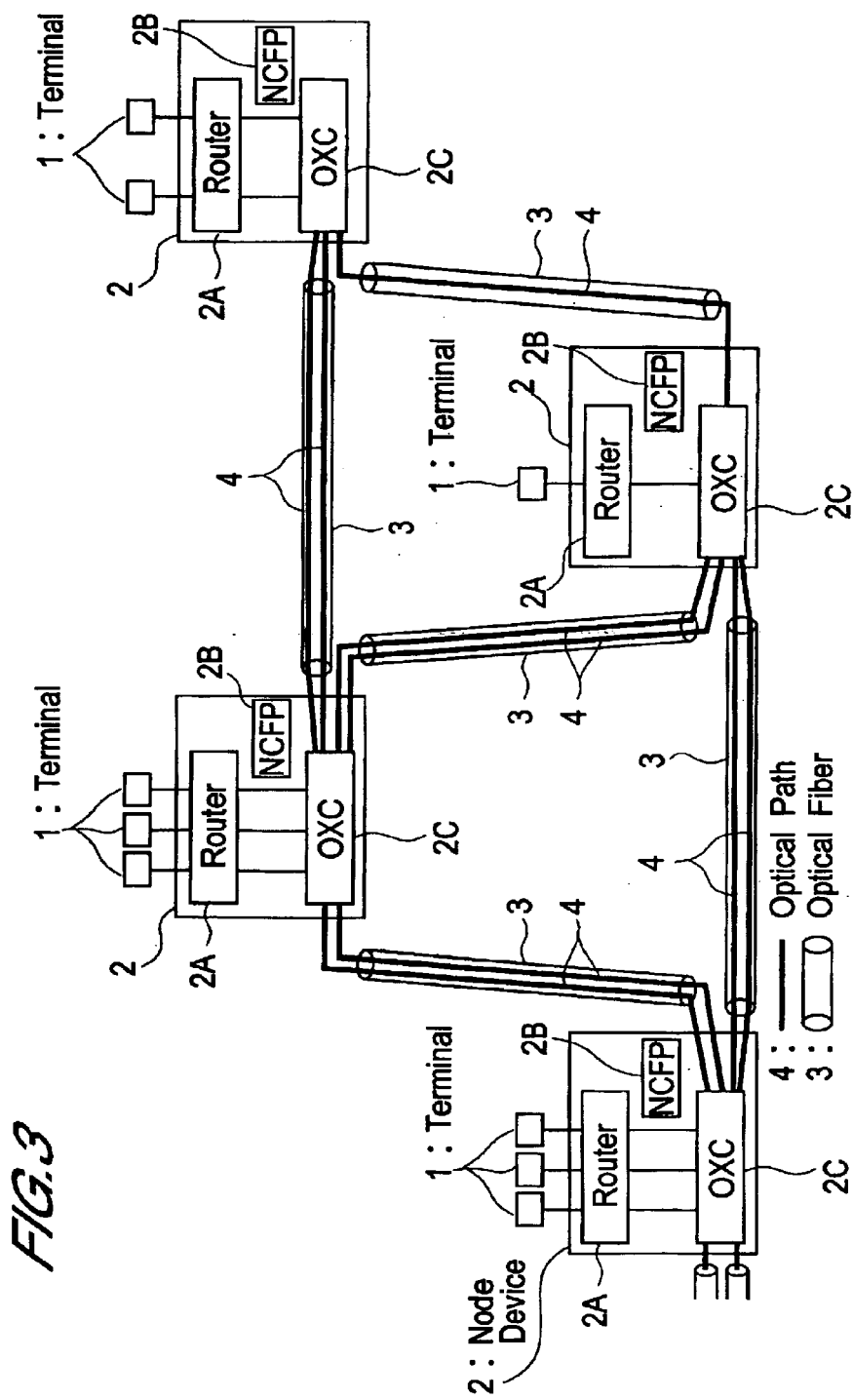

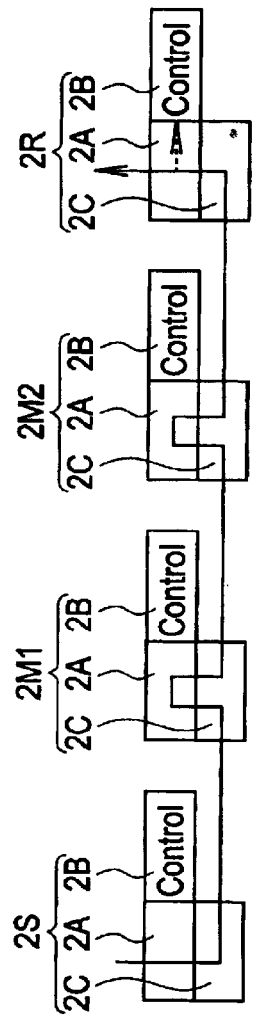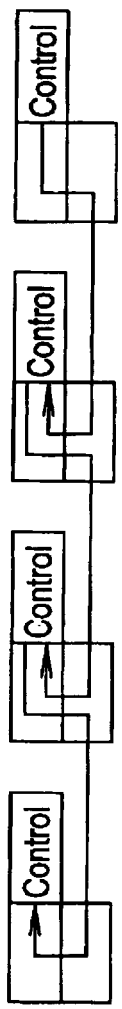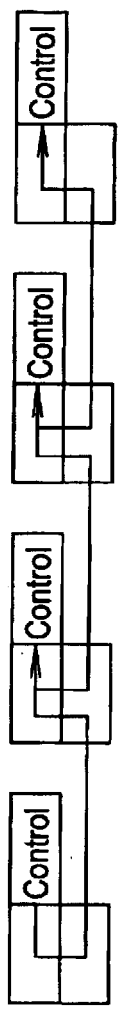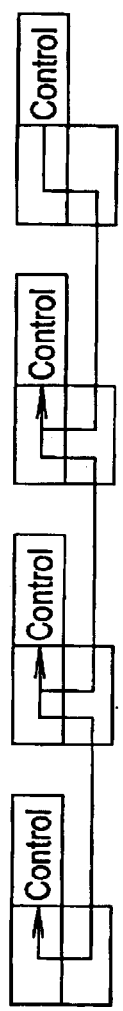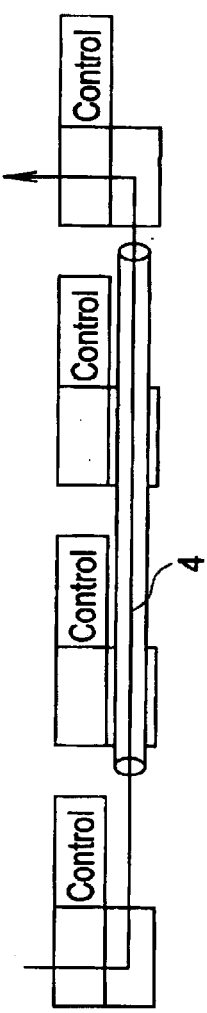
FIG.4(A)
FIG.4(B)
FIG.4(C)
FIG.4(D)
FIG.4(E)

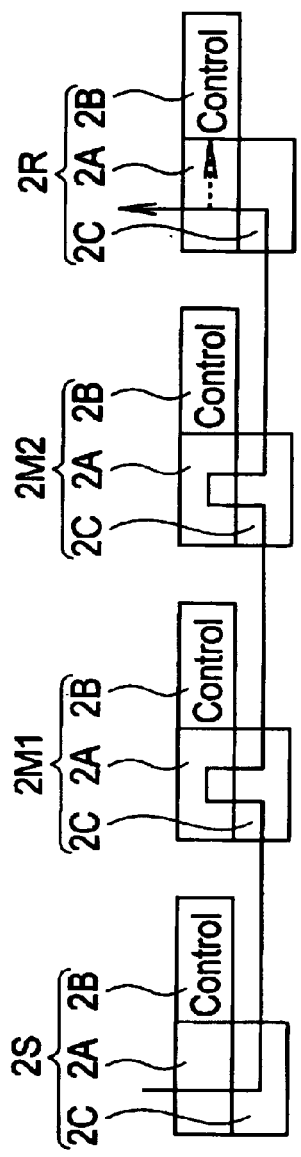
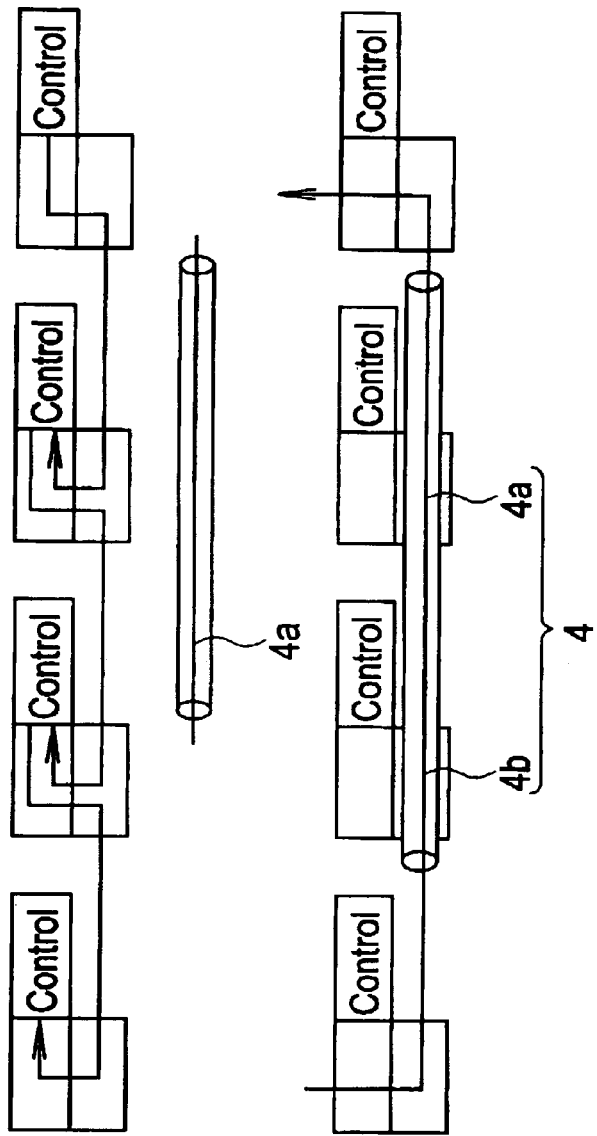
FIG.8(A)
FIG.8(B)
FIG.8(C)

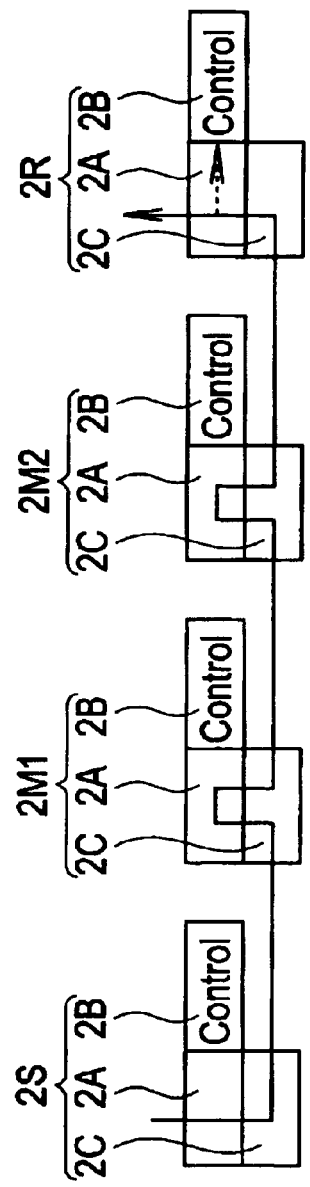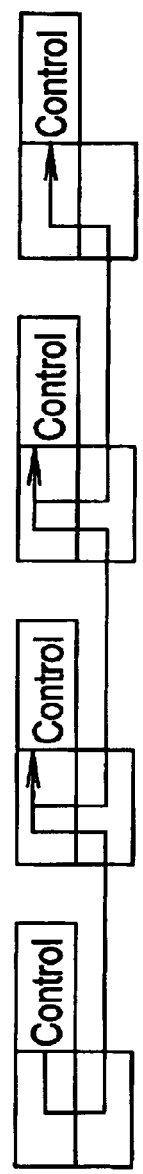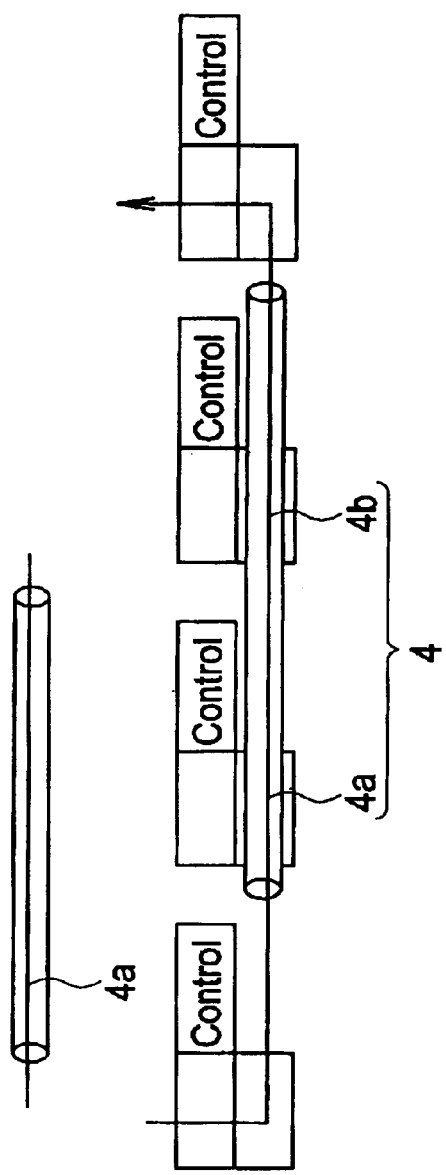
FIG.9(A)
FIG.9(B)
FIG.9(C)

NODE DEVICE AND OPTICAL NETWORK SYSTEM

BACKGROUND OF THE INVENTION

1. Field of the Invention

The present invention relates to a node control device, node device and optical path setting method suitable for establishing an optical network system.

2. Description of Related Art

FIG. 1 shows an aspect of a conventional optical network system. As FIG. 1 shows, the optical network system comprises user terminals 110 connected to routers (or a packet switching machine) 100 and optical cross-connects or optical add-dropmultiplexer (OADM) 130 which are connected with the router 100 and are inter-connected via inter-office optical fibers 120. The optical cross-connect 130 is an device for executing the relay/insertion (add) /extraction (drop) of optical signals and the setting connection of optical signals (that is, optical paths 140) between two node devices which are not necessarily adjacent to each other.

Some of the optical cross-connects 130 do not use wavelength division multiplexing transmission technology, but they also handle optical paths which are optical signal connections given by OCDM or OTDM technology. The many optical cross-connects use a wavelength division multiplexing transmission technology where a plurality of optical signals are sent over one optical fiber, and these multiplexed signals are used as a resource for transmission so as to increase capacity. Actually, the optical cross-connects 130 in FIG. 1 can multiplex a plurality of optical signals having different wavelengths using wavelength multiplexers/demultiplexers and optical spatial switches. An interface 150 is disposed between the router 100 or electronic switching machine (for example, SDH systems or ATM systems) and the optical cross-connect 130 shown in FIG. 1. For this interface 150, wavelength variable (or fix) type O/O (optical/optical) or E/O (Electric/Optical) conversion device and O/E (Optical/Electric) conversion device are used.

Next a packet transmission aspect implemented on such an optical network system will be explained. At first, a packet sent from a user terminal 110 is transmitted to the router 100 via the transmission path. The router 100 analyzes the header of this packet, and transfers the packet to an input interface 150 of the optical path (connection of optical signals) 140 which is set between routers (strictly speaking, an optical path is allocated between interfaces for routers in different nodes) where the destination terminal is connected to or an appropriate router for relaying. By repeating such an operation (packet relay by routers), the transfer target packet reaches the router 100 accommodating the destination user terminal, and is transferred to the destination user terminal 110 via this router.

The optical path 140 shown in FIG. 1 is set by the optical cross-connect (e.g. optical ADM (Add/Drop Multiplexer)) 130 and the optical fiber 120. The input/output interface 150 is disposed between the optical cross-connect 130 and the packet switching machine (e.g. router, electronic switching machine) 100.

Setting of the optical path 140 in the above mentioned optical network system, however, is semi-fixed. So a method for dynamically setting this optical path 140 according to the traffic is under current study.

It is accordingly the first object of the present invention to provide an optical path setting method for dynamically setting an optical path according to the traffic.

It is a second object of the present invention to provide a node control device for such an optical path setting.

It is the third object of the present invention to provide a node device having such a node control device.

SUMMARY OF THE INVENTION (A) To achieve these objects, the first configuration example of the node control device of the present invention is a node control device which is disposed in each node device constituting an optical network system, and is used for controlling the packet transfer operation in each node device, comprising:

(1) edge/core determination means for determining whether a node device which the node control device is controlling (hereafter to be referred to as the present node device) is a transmission side edge node device, a core node device, or a destination side edge node device for the transfer packet to be processed;

(2) cut-through request packet processing means which, when the present node device is the destination side edge node device, notifies the open resource information of the present node device to the upstream side of the transfer route as a cut-through request packet, and, when the present node device is the core node device, transfers the cut-through request packet after adding thereto the open resource information of the present node device which is received from the downstream side of the transfer route or is individually generated;

(3) optical path allocation request packet processing means for determining an optimum allocation of an optical path based on the open resource information of the cut-through request packet transferred to the transmission side edge node device, and notifying the allocation to the target transmission side edge node device, core node device, and destination side edge node device respectively by an optical path allocation request packet, and (4) optical path switching control means for controlling an optical switch according to the allocation notified by the optical path allocation request packet, setting an optical path which omits the layer 2 and layer 3 processing, and notifying the completion thereof to the transmission side edge node device by an optical path setting completion notice packet.

By the present invention, the optical path is set with the packet flow as a trigger, then packets go through the set optical path so that the device load on layer 2 and/or layer 3, such as a router of the core node device, can be decreased.

With this configuration according to the present invention, an optimum optical path allocation can be determined by the transmission edge node device, so applying an excessive load on the destination side edge node device can be prevented. (B) The second configuration example of the node control device of the present invention is a node control device which is disposed in each node device constituting an optical network system, and is used for controlling the packet transfer operation in each node device, comprising:

(1) edge/core determination means for determining whether a node device which the node control device is controlling (hereafter to be referred to as the present node device) is a transmission side edge node device, a core node device, or a destination side edge node device for the transfer packet to be. processed;

(2) cut-through request packet processing means which, when the present node device is the transmission side edge node device, notifies the open resource information of the present node device to the downstream side of the transfer route as a cut-through request packet, and, when the present node device is the core node device, transfers cut-through request packet after adding thereto the open resource information of the present node device which is received from the upstream side of the transfer route or is individually generated;

(3) optical path allocation request packet processing means for determining an optimum allocation of the optical path based on the open resource information of the cut-through request packet transferred to the destination side edge node device, and notifying the allocation to the target transmission side edge node device, core node device, and destination side edge node device respectively by an optical path allocation request packet; and (4) optical path switching control means for controlling an optical switch according to the allocation notified by the optical path allocation request packet, setting an optical path which omits the layer 2 and layer 3 processing, and notifying the completion thereof to the transmission side edge node device by an optical path setting completion notice packet.

By the present invention, the optical path is set with the packet flow as a trigger, then packets go through the set optical path so that the device load on layer 2 and/or layer 3, such as a router of the core node device, can be decreased.

With this configuration according to the present invention, an optimum optical path allocation can be determined by the destination side edge node device, which allows to prevent an excessive load from being applied on the transmission side edge node device.

(C) The third configuration example of the node control device of the present invention is a node control device which is disposed in each node device constituting an optical network system, and is used for controlling the packet transfer operation in each node device, comprising:

(1) edge/core determination means for determining whether a node device which the node control device is controlling (hereafter to be referred to as the present node device) is a transmission side edge node device, a core node device, or a destination side edge node device for the transfer packet to be processed;

(2) cut-through setting packet processing means which, when the present node device is the destination side edge node device, notifies the open resource information of the present node device to the upstream side of the transfer route as a cut through setting packet, and, when the present node device is the core node device, determines whether cut through by the open resource indicated in the cut-through setting packet received from the downstream side of the transfer route is possible, and if possible, transfers the received cut-through setting packet to the upstream side of the transfer route after adding the information to the cut-through setting packet, and if impossible, transfers the received cut-through setting packet to the upstream side of the transfer route after adding thereto the cut-through information which has been set thus far and the open resource information of the present node device; and (3) optical path switching control means which, when the cut-through setting packet processing means determines that cut through is possible, controls an optical switch so as to set an optical path to the resource for which it was determined that cut through is possible.

With this configuration according to the present invention, the possibility of setting of a cut-through optical path is autonomously determined during the process for transferring the open resource information of each node device from the destination side edge node device to the transmission side edge node device, and the optical path is set when setting is possible, so the required time until setting can be decreased.

(D) The fourth configuration example of the node control device of the present invention is a node control device which is disposed in each node device constituting an optical network system, and is used for controlling the packet transfer operation in each node device, comprising:

(1) edge/core determination means for determining whether a node device which the node control device is controlling (hereafter to be referred to as the present node device) is a transmission side edge node device, a core node device, or a destination side edge node device for the transfer packet to be processed;

(2) cut-through setting packet processing means which, when the present node device is the transmission side edge node device, notifies the open resource information of the present node device to the downstream side of the transfer route as a cut-through setting packet, and, when the present node device is the core node device, determines whether cut through by the open resource indicated in the cut-through setting packet received from the downstream side of the transfer route is possible, and if possible, transfers the received cut-through setting packet to the downstream side of the transfer routeafter adding the information to the cut-through setting packet, and if impossible, transfers the received cut-through setting packet to the downstream side of the transfer route after adding thereto the cut-through information which has been set thus far and the open resource information of the present node device; and (3) optical path switching control means which, when the cut-through setting packet processing means determines that cut through is possible, controls an optical switch so as to set the optical path to the resource for which it was determined that cut through is possible.

With this configuration according to the present invention, the possibility of setting a cut-through optical path is autonomously determined during the process for transferring the open resource information of each node device from the transmission side edge node device to the destination side edge node device, and the optical path is set when setting is possible, so the required time until setting can be decreased.

(E) According to the fifth configuration example of the node control device, it is preferable that each of the first to fourth configuration examples of the present invention further comprises forced releasing means for forcibly releasing the optical path when a predetermined time has elapsed since setting of the optical path, or when a decrease in the number of communication packets is confirmed at the node device positioned at both ends of the optical path. This function allows prevent an unnecessary waste of resources.

(F) According to the sixth configuration example of the node control device, it is preferable that each of the first to fifth configuration examples of the present invention further comprises cut-through optical path necessary/unnecessary determination means for determining the necessity of cut through before transmitting the cut-through request packet or transmitting the cut-through setting packet, so that the cut-through optical path is selectively set only when determined as necessary. This function allows to prevent the setting of the cut-through optical path for a small volume of packets, so as not to waste resources.

(G) According to the seventh configuration example of the node control device, it is preferable that each of the first to sixth configuration examples of the present invention further comprises information channel insuring means for determining whether the information channel is continuously insured after setting the cut-through optical path between the node devices on the route where the cut-through optical path is set before transmitting the cut-through request packet or transmitting the cut-through setting packet, and setting the cut-through optical path only when the information channel is insured.

With this configuration according to the present invention, the cut-through optical path is set only when the information channel is insured, so a state where information cannot be forwarded between the node devices on the optical path route after setting the cut-through optical path can be absolutely prevented.

(H) According to the first configuration example of the node device of the present invention, a node device comprises:

(1) a router for determining the output destination of a transfer packet which is input according to the header information of the layer 3;

(2) an optical cross-connect for extracting (dropping) optical signals from an optical fiber or inserting (adding) optical signals into an optical fiber, or relaying optical signals between arbitrary input/output optical fibers for optical path setting; and (3) anode control device according to one of the above mentioned first to seventh configuration examples for switching a connected pair of each input port and output port inside the optical cross-connect according to the instructions of the received transfer packet or based on self judgment.

By using such a configuration of the node device, the node device of the present invention can implement such effects as optimizing the cut-through optical path, decreasing the cut-through optical path setting time, effective use of resources and insuring the information channel.

(I) According to the second configuration example of the node device of the present invention, it is preferable that the first configuration example of the node device further comprises a switch which connects a destination-based buffer to some of the outputs from the router to the optical cross-connect, and can connect a packet read from the destination-based buffer to an arbitrary input port of the optical cross-connect. This configuration allows to improve band-width efficiency using the cut-through optical path.

(J) According to the third configuration example of the node device of the present invention, it is preferable that the above mentioned second configuration example of the node device further comprises allowable delay recognition function means at the router for determining the allowable delay of a transfer packet, so that only packets with a large allowable delay are allowed to be output to the destination-based buffer and packets with a small allowable delay are directly output to the optical cross-connect. This configuration allows to avoid a state where a packet with a small allowable delay time, such as a real-time type packet, is stored in the destination-based buffer, and the deterioration of communication quality can be effectively prevented.

(K) According to the fourth configuration example of the node device of the present invention, a node device comprises:

(1) a router for determining the output destination of a transfer packet which is input according to the header information of the layer 3 (=IP layer);

(2) an optical cross-connect for extracting (dropping) optical signals from an optical fiber, or inserting (adding) optical signals into an optical fiber, or relaying optical signals between arbitrary input/output optical fibers for optical path setting;

(3) a node control device according to one of the above mentioned first to sixth configuration examples for switching a connected pair of each input port and output port inside the optical cross-connect according to instructions of the received transfer packet or based on self judgment; and (4) optical path extraction/insertion (drop/add) means for the information channel for extracting (dropping) optical signals (destination side optical path termination) with a fixed-wavelength insured for the information channel from the optical fiber, or for inserting (adding) the optical signals (source side optical path termination) with a fixed wavelength into the optical fiber, so as to enable communication of information signals with another node device.

By using such a configuration for the node device, the node device of the present invention can not only implement such effects as optimizing the cut-through optical path, decreasing the cut-through optical path setting time and effective use of resources, but also insure the information channel.

(L) According to the fifth configuration example of the node device of the present invention, a node device comprises:

(1) a router for determining the output destination of a transfer packet which is input according to the header information of the higher layer (=IP layer);

(2) an optical cross-connect for extracting (dropping) optical signals from an optical fiber, or inserting (adding) optical signals into an optical fiber, or relaying optical signals between arbitrary input/output optical fibers for optical path setting;

(3) anode control device according to one of the above mentioned first to sixth configuration examples for switching a connected pair of each input port and output port inside the optical cross-connect according to the instructions of the received transfer packet or based on self judgment; and (4) pilot tone signal transmission means for the information channel for overlaying pilot tone signals for the information channel on the optical path for user data or separating pilot tone signals for the information channel from the optical path for user data so as to enable communication of information signals with another node device.

By using such a configuration for the node device, the node device of the present invention can not only implement such effects as optimizing the cut-through optical path, decreasing the cut-through optical path setting time, and effective use of resources, but also insure the information channel.

(M) According to the sixth configuration example of the node device of the present invention, it is preferable that, in the above mentioned fifth configuration example of the node device, the pilot tone signals for the information channel are transmitted by a time division multiplex system, so that the potential collision of pilot tones can be eliminated.

(N) According to the optical network system of the present invention, an optical network system is constituted by providing a plurality of node device according to one of the above mentioned first to sixth configuration examples of the node device, so that the optical network system can implement such effects as optimizing the cut-through optical path, decreasing the cut-through optical path setting time, effective use of resources, and insuring the information channel.

(O) According to the first configuration example of the optical path setting method of the present invention, an optical path setting method in an optical network system comprises:

(1) a step where a destination side edge node device which confirmed the transfer of a packet to a terminal accommodated by the present node device or an access system network notifies the open resource information of the present node device to a transmission side edge node device;

(2) a step where the transmission side edge node device determines an optimum allocation of an optical path to be set on the transfer route based on the open resource information notified by the destination side edge node device and the core node device; and (3) a step where the transmission side edge node device, the core node device and the destination side edge node device set the optical path which omits the packet transfer processing (layer 2 and layer 3 processing) in transit nodes for the optical path determined in the previous step.

This can provide an optical path setting method which can prevent applying an excessive load on the destination side edge node device.

(P) According to the second configuration example of the optical path setting method of the present invention, an optical path setting method in an optical network system comprises:

(1) a step where a transmission side edge node device which confirmed the transfer of a packet to a destination notifies the open resource information of the present node device to a destination side edge node device;

(2) a step where the destination side edge node device determines the optimum allocation of the optical path to be set on the transfer route based on the open resource information notified by the transmission side edge node device and the core node device; and (3) a step where the transmission side edge node device, the core node device and the destination side edge node device set the optical path which omits the packet transfer processing (layer 2 and layer 3 processing) in transit nodes for the optical path determined in the previous step.

This can provide an optical path setting method which can prevent applying an excessive load on the transmission side edge node device.

(Q) According to the third configuration example of the optical path setting method of the present invention, an optical path setting method in an optical network system comprises:

(1) a step where a destination side edge node device which confirmed the transfer of a packet to a terminal accommodated by the present node device or to the access system network transmits the open resource information of the present node device to a transmission side edge node device which is at the upstream side; and (2) a step where the core node device and a transmission side edge node device, to which the open resource information is transferred, determine respectively whether the setting of a cut-through optical path is possible based on the open resource information received from the downstream side of the present node device, and if possible, the core node device and the transmission side edge node device set a cut-through optical packet using the resource which was determined as possible, and notify the information to the upstream side, and if impossible, the core node device and the transmission side edge node device add the cut-through information which has been set thus far and the open resource information of the present node device to the received open resource information, and transfer it to the upstream side.

With this configuration according to the present invention, the possibility of setting a cut-through optical path can be autonomously determined during the process where the open resource information of each node device is transferred from the destination side edge node device to the transmission side edge node device, and the optical path is set if setting is possible, so the required time until setting can be decreased.

(R) According to the fourth configuration example of the optical path setting method of the present invention, an optical path setting method in an optical network system comprises:

(1) a step where a transmission side edge node device which confirmed the transfer of a packet to a destination transmits the open resource information of the present node device to a transmission side edge node device which is at the downstream side; and (2) a step where a core node device and the destination side edge node device to which the open resource information is transferred determine respectively whether the setting of a cut-through optical path is possible based on the open resource information received from the upstream side of the present node device, and if possible, the core node device and the destination side edge node device set the cut-through optical packet using the resource which was determined as possible, and notify the information to the downstream side, and if impossible, the core node device and the destination side edge node device add the cut-through information which has been set thus far and the open resource information of the present node device to the received open resource information, and transfer it to the downstream side.

With this configuration according to the present invention, the possibility of setting a cut-through optical path can be autonomously judged during the process where the open resource information of each node device is transferred from the transmission side edge node device to the destination side edge node device, and the optical path is set if setting is possible, therefore the required time until setting can be decreased.

(S) According to the fifth configuration example of the optical path setting method of the present invention, it is preferable that, in the optical path setting method according to the above mentioned first to fourth configuration examples, the optical path is forcibly released when a predetermined time has elapsed since the setting of the optical path or when a decrease in the number of communication packets is confirmed at the node device positioned at both ends of the optical path.

(T) According to the sixth configuration example of the optical path setting method of the present invention, it is preferable that, in the optical path setting method according to the first to fifth configuration examples, the necessity of cut through is determined before setting the cut-through optical path, and the setting processing is continued only when the necessity is determined. This function allows to prevent setting the cut-through optical path for transmitting just a small volume of packets for example, so resources are not wasted.

(U) According to the seventh configuration example of the optical path setting method of the present invention, it is preferable that, in the optical path setting method according to the above mentioned first to sixth configuration examples, it is determined whether the information channel is continuously insured after setting the cut-through optical path between the node devices on the route where the cut-through optical path is set before setting the cut-through optical path, and the cut-through optical path is set only when the information channel is insured. In this way, according to the present invention, the cut-through optical path is set only when the information channel is insured, and thereby a state where information cannot be forwarded between the node devices on the cut-through optical path route after setting the cut-through path can be absolutely prevented.

(V) According to the eighth configuration example of the optical path setting method of the present invention, it is preferable that, in the optical path setting method according to the above mentioned first to seventh configuration examples, a packet read from the destination-based buffer is transmitted to the cut-through optical path after setting. Thereby, band-width efficiency using the cut-through optical path can be improved.

(W) According to the ninth configuration example of the optical path setting method of the present invention, it is preferable that, in the above mentioned optical path setting method, only packets with a large allowable delay are stored in the destination-based buffer. This allows to prevent a state where a packet with a small allowable delay time, such as a real-time type packet, is erroneously stored in the destination-based buffer, and the deterioration of communication quality can be effectively prevented.

(X) According to the tenth configuration example of the optical path setting method of the present invention, it is preferable that, in the optical path setting method according to the above mentioned first to sixth configuration examples and the eighth and ninth configuration examples, the information communication between the node devices, where the cut-through optical path is set, is implemented using optical signals with a fixed wavelength insured for the information channel after the cut-through optical path is set. This allows to always insure the information channel after the cut-through optical path is set.

(Y) According to the eleventh configuration example of the optical path setting method of the present invention, it is preferable that, in the optical path setting method according to the above mentioned first to sixth configuration examples and the eighth to tenth configuration examples of the above mentioned optical path setting method, the pilot tone signal for the information channel is overlaid on the optical path for user data to implement information communication between the node devices, where the cut-through optical path is set, after the cut-through optical path is set. This also allows to always insure the information channel after the cut-through optical path is set.

(Z) According to the twelfth configuration example of the optical path setting method of the present invention, it is preferable that, in the optical path setting method according to the above mentioned eleventh configuration example, the pilot tone signals for the information channel are transmitted in the time division multiplex system. This allows to eliminate the potential collision of pilot tones.

With the above mentioned configuration examples, each node device has an optical cross-connect as one composing element. However, each node device may use ADM (Add/Drop Multiplexer) having a switching function to switch the Add/Drop state/relay state instead of using the optical cross-connect.

According to a preferable example of an optical network system of the present invention, the system comprises a plurality of edge node devices which are designed as dedicated for respective edge nodes and one or more core node devices which are connected between said plurality of edge node devices via a transfer route and are designed as dedicated for respective core nodes. The edge node device is connected only between an external terminal, etc. and the core node device. The core node device is connected only with both or one of said edge node device and another core node device, and has core node input/output ports for forwarding a transfer packet with the other core node device but does not have input/output ports for forwarding a transfer packet with an external terminal.

With this configuration according to the present invention, it is preferable, in terms of construction cost, to provide an optical network system by providing a node device where the edge node device, and core node device are designated as dedicated for the respective edge node and core node.

BRIEF DESCRIPTION OF THE DRAWINGS

The foregoing and other objects, features and advantages of the present invention will be better understood from the following description taken in connection with accompanying drawings, in which:

FIG. 1 is a drawing depicting a prior art of an optical network system;

FIG. 2 is a functional block diagram depicting a first embodiment of the node device in accordance with the present invention;

FIG. 3 is a drawing depicting an embodiment of the optical network system in accordance with the present invention;

FIG. 4 is a drawing depicting a transfer path of packets in accordance with the present invention (first embodiment);

FIG. 8 is a drawing depicting a transfer path of packets in accordance with the present invention (third embodiment);

FIG. 9 is a drawing depicting another example of a transfer path of packets in accordance with the present invention (third embodiment);

DESCRIPTION OF THE PREFERRED EMBODIMENTS (A) Configuration of Optical Network System FIG. 3 shows an embodiment of the optical network system in accordance with the present invention. As FIG. 3 shows, this optical network system comprises node device 2 to which one or more terminals 1 are connected, and optical fibers 3 which inter-connect these node device 2. Although FIG. 3 shows the case when the optical network is created in a net configuration, the optical network can also be created in a loop or other configuration.

Figure 5:
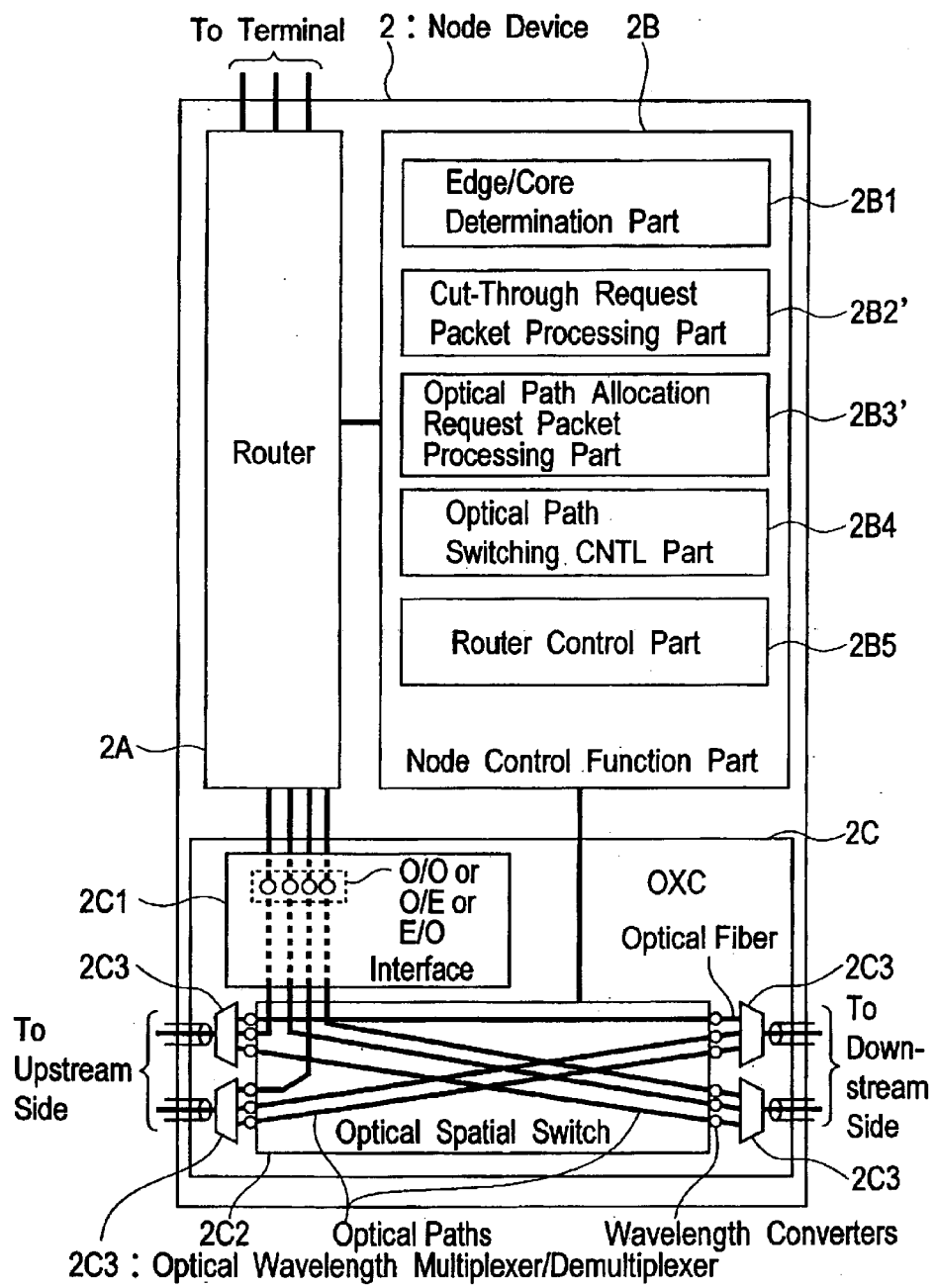
FIG. 5 is a functional block diagram depicting a second embodiment of the node device in accordance with the present invention.

In this optical network system, the node device in accordance with embodiments to be discussed later are used for the node device 2. In other words, the node device 2 comprises three functional parts: a router 2A, a node control function part 2B for controlling the operation of the node device in general, and an optical cross-connect 2C.

The optical cross-connect may include a wavelength converter and ADM (Add/Drop Multiplexer) having a switching function to switch the Add/Drop state/relay state may be used instead of the optical cross-connect. This means of implementing the optical switch is not restricted by a switch using the Opt-Electric effect, but a mechanical optical switch or a pseudo-optical switch having the same interface function, such as switching light to electricity by an electrical switch then converting it to light again, may be used.

These three functional parts need not be disposed in a single housing, but may be disposed in separate housings respectively. In the following description, an device which implements the optical path setting function, which is implemented by linking these three functional parts, is called the "node device".

In the following description, when it is necessary to distinguish the node device having a configuration unique to the present invention from an ordinary node device which is generally used, the node device having the configuration unique to the present invention is called the "IP (Internet Protocol)/optical multi-layer switch node device".

Now various embodiments will be described in sequence, taking an example in which the node device, node control device and the optical path setting method in accordance with the present invention are implemented as an IP/optical multi-layer switch node.

(B) First Embodiment (B-1) Functional Configuration

FIG. 2 shows a functional configuration of the node device in accordance with the first embodiment. As FIG. 2 shows, or as the above description explains, the node device 2 comprises a router 2A, a node control function part 2B and an optical cross-connect 2C which is called as an optical XC. The node control function part is also referred to as node control device.

The router 2A has a function to read the header part from the packet signal which was input, and determines the output destination according to the destination described in this header part. The destination here is not only another node device or a terminal or access system network connected to the concerned node device (hereafter this may be referred to as "present node device"), but maybe the present node device itself. The router 2A also has a function to notify the information on the transferred packet to-the node control function part 2B.

The node control function part 2B has a function to switch the directions of the optical cross-connect 2C autonomously by the determination of itself or based on the instructions of the received packet. This node control function part 2B constitutes the major part of the node device in accordance with the present invention.

The optical cross-connect 2C has a function to channel optical signals input from another node device to an arbitrary output optical fiber by inserting (adding) the optical signals into the optical fiber net (i.e. source side optical path termination) or extracting (dropping) the optical signals from the optical fiber net (i.e. destination side optical path termination), so as to set an optical path between two node device which are physically not necessarily adjacent to each other.

(B-2) Configuration of Node Control Function Part 2B

The node control function part 2B in accordance with this embodiment comprises the following five functional parts.

(a) Edge/core determination part 2B1

(b) Cut-through request packet processing part 2B2

(c) Optical path allocation request packet processing part 2B3

(d) Optical path switching control part 2B4

(e) Router control part 2B5

(B-2-1) Edge/Core Determination Part 2B1

The edge/core determination part 2B1 is a function part for each node device to determine its position in the optical network system. The edge/core determination part 2B1 specifically determines whether the concerned node device, that is, the present node device is a transmission side edge node device, a core node device, or a destination side edge node device. This distinction is determined by the relationship between the present node device, that is, the IP/optical multi-layer switch node device, and a packet to be input to this node device. In the present invention, when the present node device is the IP/optical multi-layer switch node device, the transmission side edge node device, core node device and destination side edge node device are defined as follows.

Transmission Side Edge Node Device:

If a transfer packet is input to the present node device and the input origination node device of the packet is not IP/optical multi-layer switch node device of the present invention, then the present node device is the transmission side edge node device for the packet.

However, if a previous node device, to which a packet is input, of a node device is an IP/optical multi-layer switch, the management or operation thereof is executed by another network, and the optical path is always set with the present node device as the start point, then the present node device is the destination side edge node device.

Core Node Device:

If a transfer packet is input to the present node device and both the input origination node device of the packet and the destination node device to which the packet is transferred next are the IP/optical multi-layer switch node device of the present invention, then the present node device is the core node device for the packet.

Destination Side Edge Node Device:

If a transfer packet is input to the present node device and the destination node device to which the packet is transferred next is not the IP/optical multi-layer switch node device, then the present node device is the destination side edge node device for the packet.

However, if the next node device, to which the packet is transferred, of a node device is an IP/optical multi-layer switch, the management or operation thereof is executed by another network, and the optical path is always terminated by the present node device, then the present node device is the destination side edge node device.

In this way, the relationship between the present node device and the packet to be input thereto determines whether the IP/optical multi-layer switch node device of the present invention is the transmission side edge node device, core node device or destination side edge node device. Therefore, it is possible that an IP/optical multi-layer switch node device is defined as the transmission side edge node device based on the relationship with a packet, and is also defined as the core node device based on the relationship with another packet.

The edge/core determination part 2B1 determines which node device is the concerned node device, that is, the present node device, based on the above criterion.

(B-2-2) Cut-through Request Packet Processing Part 2B2

The cut-through request packet processing part 2B2 is a functional part for collecting optical path resource and trafic information required for setting a cut-through optical path. This functional part operates as follows according to the determination result of the above mentioned edge/core determination part 2B1.

If the present node device is determined as the destination side edge node device, then the cut-through request packet processing part 2B2 notifies the existence of the packet which passed through the present node device and the open resource and traffic information (e.g. wavelength) of the present node device as a cut-through request packet, to the node device which is positioned next to the present node device at the upstream side (transmission origination side).

If reception of the cut-through request packet is confirmed and the present node device is determined as the core node device for this packet by the edge/core determination part 2B1, then the cut-through request packet processing part 2B2 adds the open resource information of the present node device to the received cut-through request packet and transfers the packet to the node device at the upstream side.

(B-2-3) Optical Path Allocation Request Packet Processing Part 2B3

The optical path allocation request packet processing part 2B3 is a functional part for determining the allocation of a cut-through optical path based on the collected open resource information and requesting the setting of the cut-through optical path based on this allocation. This functional part. operates as follows according to the determination result of the above mentioned edge/core determination part 2B1.

When the reception of a cut-through request packet is confirmed and the edge/core determination part 2B1 determines that the present node device is the transmission side edge node device for this packet, the optical path allocation request packet processing part 2B3 calculates the optimum allocation of the optical path based on the open resource information and other data like traffic information included in the packet. Or the processing part 2B3 determines the optimum allocation of the optical path based on the lock-up table, instead of the above calculation. The processing part 2B3 notifies the cut-through optical path setting request based on the result to the present node device, the core node device and the destination side edge node device. An optical path allocation request packet is used for this notification.

The above mentioned "cut-through request packet" and the "optical path allocation request packet" may be collectively called the "optical path control packet".

(B-2-4) Optical Path Switching Control Part 2B4

The optical path switching control part 2B4 is a functional part for the node device 2 to actually set the cut-through optical path according to the instructions of the received optical path allocation request packet.

When the reception of the optical path allocation request packet is confirmed, the optical path switching control part 2B4 controls the optical cross-connect 2C according to the instructions of this packet, and sets the cut-through optical path in the present node device. When the setting of the cut-through optical path completes, the optical path switching control part 2B4 transmits the optical path setting completion notice packet and notifies the completion to the transmission side edge node device.

(B-2-5) Router Control Part 2B5

The router control part 2B5 is a functional part for notifying completion of the setting of the cut-through optical path to the router 2A, and instructing the router 2A to transfer a series of packets via the cut-through optical path from there on.

The router control part 2B5 can release the newly set cut-through optical path when a predetermined time has elapsed since the initial setting, or when an event occurs, such as a decrease in the number of communication packets (from the threshold) at the node device positioned at both ends of the cut-through optical path. Release here may be a physical release or may be a logical release, where the setting status remains but the path is regarded as an available resource so that the setting is changed when a new optical path setting is requested.

The decrease in the number of communication packets at the node device positioned at both ends of the cut-through path is notified via a dedicated communication line (optical path or electric wire) disposed between the node devices or via several hops of other optical paths displaced between the node devices.

(B-3) Optical Path Setting Operation

Next the optical path setting operation by the node device (node control device, optical path setting method) having the above mentioned functional configuration will be described. FIG. 4 shows a setting of an optical path for cut-through in an optical network. In FIG. 4, only an outline of the node device 2 is shown. Also in FIG. 4, the left end is the upstream side of the path route and the right end is the downstream side of the path route. In other words, the node device 2S at the left end operates as the transmission side edge node device, the node device 2R at the right end operates as the destination side edge node device, and the two node device 2M1 and 2M2 disposed between these operate as the core node device.

(1) Transfer of User Packet

In the first step shown in FIG. 4 (A), the first user packet for a destination arrives from a terminal (or a net in an access system) to a node device 2S (transmission side edge node device at the left in FIG. 4) accommodating the destination.

At this time, the node device 2S (that is, the transmission side edge node device) transfers the packet to the next transfer destination, that is, the node device 2M1, according to the optical path and routing table currently set at the router 2A of the node device 2S.

The node device 2M1, to which the first packet was transferred, transfers the packet to the node device 2M2 which is the next transfer destination in the same way, as long as the node device 2M1 is not the destination side edge node device. The first packet is eventually transferred to the node device 2R, (that is, the destination side edge node device) accommodating the destination terminal (or net of an access system), and is transferred to the destination via the router 2A of the node device 2R.

In the above transfer operation, transfer is executed by the routing function of the router 2A without intervention of the node control function part 2B. The flow of the packet shown by the arrow marks in FIG. 4(A) shows this transfer operation.

(2) Transfer of Cut-through Request Packet

The next step is started by the destination side edge node device 2R. The router 2A of each node device 2 (2S, 2M1, 2M2, 2R) has a function to transfer the packet to the node control function part 2B, as well as transferring the packet to the next transfer destination, when the destination of the user packet is the terminal (or net of an access system) of the concerned node device, that is, the present node device. (This function is shown by an arrow mark (broken line) in FIG. 4(A), for example.)

When the node control function part 2B of the node device 2R receives the user packet, the node control function part 2B confirms that the node device which the node control function part 2B belongs to is the destination edge node device using the edge/core determination part. Then this function part 2B starts up the cut-through request packet processing part 2B2, and transmits the open resource information (e.g. wavelength) to the upstream side as a cut-through request packet (FIG. 4 (B)).

The cut-through request packet transferred to the node device (core node device) 2M2 at the upstream side is routed by the router 2A of the core node device 2M2, and is sent to the node control function part 2B. The node control function part 2B of the core node device 2M2, as well, confirms the position of the present device, that is, the core node device 2M2, using the edge/core determination part 2B, just like the case of the node control function part 2B of the destination side edge node device. Then this function part 2B starts up the cut-through request packet processing part 2B2, and adds the open resource information (e.g. wavelength) of the present node device itself to the cut-through request packet and transfers the packet. This operation is executed repeatedly.

(3) Transfer of Optical Path Allocation Request Packet

The cut-through request packet eventually reaches the transmission side edge node device 2S. This node device 2S receives the cut-through request packet, then confirms that the present node device is the transmission side edge node device 2S. After this confirmation, the node device 2S starts up the optical path allocation request packet processing part 2B3 of the present node device 2S. By this startup, this processing part 2B3 calculates the optimum allocation of the optical path based on the information written in the cut-through request packet (e.g. node information on current set route and open resource information).

When the optimum allocation of the optical path is determined, the optical path allocation request packet processing part 2B3 transmits the optical path allocation request packet to each node device 2S, 2M1, 2M2 and 2R on the route, including the present node device 2S, and notifies the calculation result. This packet is transferred sequentially to the downstream side, as shown in FIG. 4(C).

When the present node device is included in one of the destinations of transfer of the optical path allocation request packet, the packet is loaded to the node control function part 2B in the present node device (core node device), and the optical path allocation request packet processing part 2B3 is started up. And the optical path allocation request packet processing part 2B3 confirms the allocation to set the cut-through optical path.

(4) Transfer of Optical Path Setting Completion Notice Packet

In each node device, after the optical path allocation request packet processing part 2B3 confirms the allocation of the optical path, the optical path switching control part 2B4 executes the actual switching of the optical cross-connect 2C. In other words, an optical path, which omits the router 2A (communication path for user packets which does not go through the router 2A), is set for the optical cross-connect 2C.

Completion of the optical path setting is notified to the transmission side edge node device 2S. This notification is performed by core node devices 2M1 and 2M2 adding information on completion of the optical path setting at the respective node devices to the optical path setting completion notice packet transmitted from the destination side edge node device 2R, and transferring the packet with this added information to the transmission side edge node as shown in FIG. 4(D).

(5) Transfer of User Packet

After this, completion of the setting of the cut-through optical path is notified to the router 2A by the router control part 2B5 of the node function part 2B, and hereafter, use of the cut-through optical path is commanded for the series of transfers of packets.

FIG. 4(E) shows the status after the cut-through optical path is allocated. As FIG. 4(E) shows, the optical path 4, which does not go through the router 2A, is set at the part of the core node device 2M1 and 2M2. Hereafter, a user packet is transferred via this cut-through optical path 4.

In the above mentioned embodiment, the node control function part 2B of the transmission side edge node device 2S calculates the optimum allocation of the optical path such that the number of relay hops by the router 2A on the route from the transmission side edge node device 2S to the destination side edge node device 2R becomes a minimum. In other words, the node control function part 2B calculates the allocation of the optical path so as to be relayed in the optical cross-connect 2C and to omit the router 2A.

This, however, does not mean that the optical path must be set to one hop without passing at all through the routers 2A of the core node device 2M1 and 2M2, which are located on the route from the transmission side edge node device 2S to the destination side edge node device 2R.

This is because as packet forwarding processing required at the router 2A decreases, the load applied to the router 2A decreases by that, and an improvement of throughput and a decrease in delay time can be achieved.

Even if the number of cut-through is not the maximum, it is possible to set the optical path based on another effective index, such as an improvement of throughput or a decrease in delay time in the entire optical network system.

Possible handling methods of a user packet, for which transfer via the cut-through optical path is demanded, are a method of allowing the user packet to standby in the node device until a new cut-through optical path is set, and a method of transferring the user packet via an old conventional path until a new cut-through optical path is set, then the path for packet transfer is changed after setting.

In the above mentioned configuration example, when the cut-through request packet processing part 2B2 receives a cut-through request packet from the downstream side for the present node device, the cut-through request packet processing part 2B2 adds the information on the present node device to this packet, and transfers the packet to the upstream side. However, this configuration may be such that the cut-through request packet is directly transmitted to the transmission side edge node device from the processing part 2B2, without waiting for the packet from downstream.

Also, in the above configuration example, the transmission side edge node device, which received the cut-through request packet, transmits the optical path allocation request packet. However, transmission of the packet need not be executed from the transmission side edge node device.

(B-4) Effect of the Embodiment

By disposing the node device (node control device, optical path setting method) having the functional configuration in accordance with the present embodiment, it becomes possible to omit the layer 2 and layer 3 processing. Therefore the load to be applied to the router 2A can be decreased dramatically compared with a conventional system. So an improvement of throughput and a decrease of delay time can be implemented in a packet transfer. As a consequence, if this optical network system is used for Internet service, for example, the user will experience such benefits as quicker response times.

In the case of conventional systems, an optical path set once is basically used with that setting, and is not switched according to the traffic of IP packets. The present invention allows optimizing the setting of an optical path (e.g. decreasing the number of hops in an IP router).

(C) Second Embodiment (C-1) Functional Configuration

The second embodiment will now be described with reference to FIG. 5. The second embodiment corresponds to a modification form of the node device in accordance with the above mentioned first embodiment, and the configuration of the functional parts 1A–2C, and each part 2B1–2B5 constituting the node control function part 2B are essentially the same as the case of the first embodiment shown in FIG. 5.

The difference is that the transfer direction of the optical path control packets (cut-through request packet and optical path allocation request packet) in, the second embodiment concerning the setting of the cut-through optical path is the opposite from the first embodiment.

Figure 6:
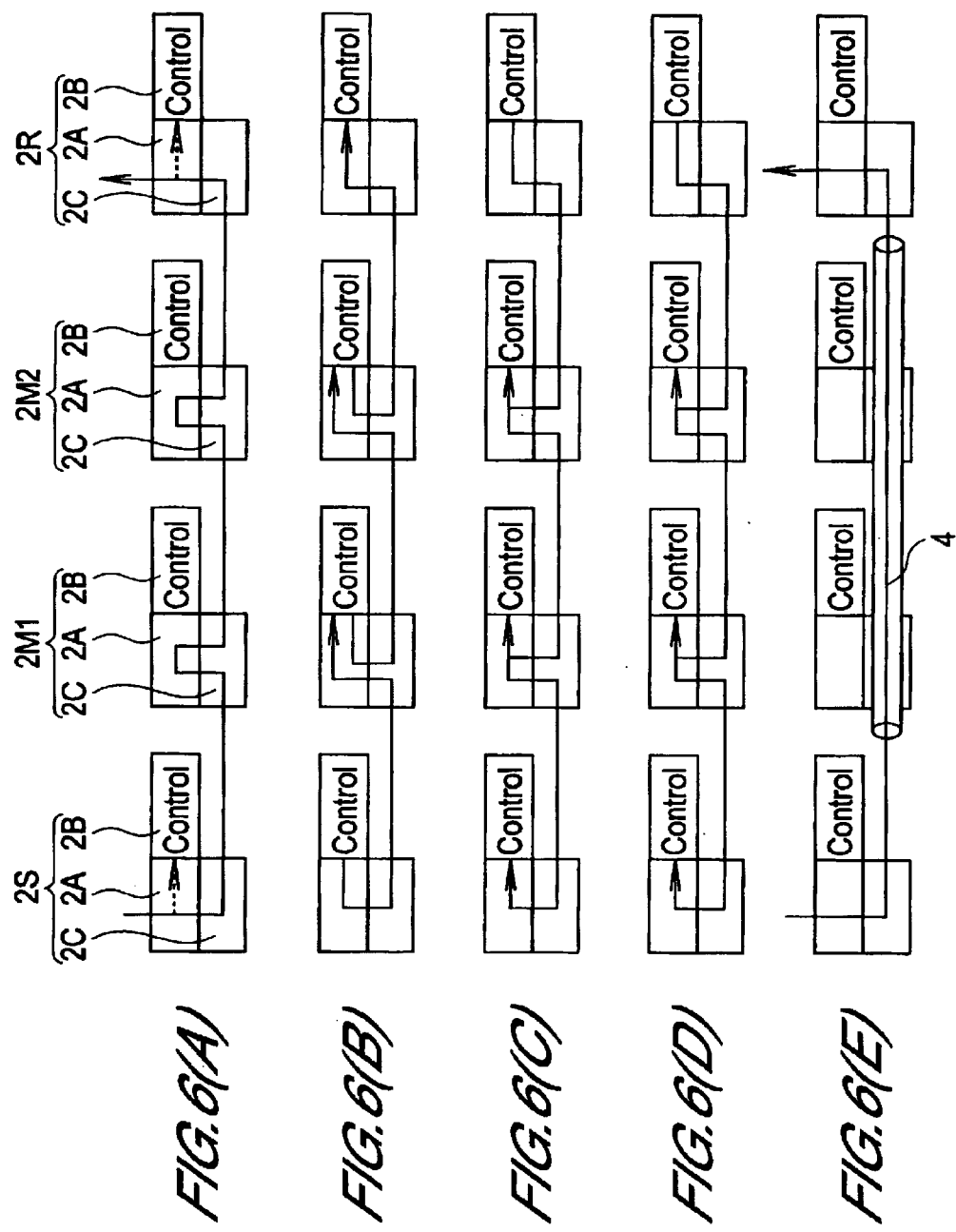
FIG. 6 is a drawing depicting a transfer path of packets in accordance with the present invention (second embodiment)

This is seen by comparing FIG. 6, which shows the status of setting the optical path for cut through in the present embodiment, and FIG. 4, which shows the status of setting the optical path for cut through in the first embodiment. As FIG. 6 and FIG. 4 show, the transfer directions of FIGS. 6(B)–6(C) are opposite the transfer directions of FIGS. 4(B)–4(C) respectively. This is the biggest difference when the optical network system is constructed by disposing the node device 2 in accordance with the present embodiment.

(C-2) Configuration of Node Control Function Part 2B

Next the configuration of the node control function part 2B, which is the cause of the difference of the transfer direction of the optical path control packets, will be described. Here, functional parts which are the same as those of the first embodiment are denoted with the same signs as FIG. 1, and functional parts which are different from those of the first embodiment are denoted with corresponding signs and a prime (').

The node control function part 2B, constituting the node device 2 in accordance with the present embodiment, comprises the following five functional parts.

(a) Edge/core determination part 2B1

(b) Cut-through request packet processing part 2B2'

(c) Optical path allocation request packet processing part 2B3'

(d) Optical path switching control part 2B4

(e) Router control part 2B5

The three functional parts 2B2' and 2B3', where functions are different from the first embodiment, will now be described. The only actual change from the first embodiment is that the transfer direction of the packet related to the setting of the cut-through optical path is reversed.

(C-2-1) Cut-through Request Packet Processing Part 2B2'

The cut-through request packet processing part 2B2' of the present embodiment as well is for collecting the optical path resouce and traffic information required for setting a cut-through optical path.

When the node device to which this cut-through request packet processing part 2B2' belongs is determined as the transmission side edge node device 2S, this processing part 2B2' notifies the information on existence of the packet, which passed the present node device, and the open resource and traffic information (e.g. wavelength) of the present node device as the cut-through request packet to the node device 2M2, which is positioned next to the present node device 2R at the downstream side (destination side).

If reception of the cut-through request packet is confirmed and the present node device is determined as the core node device for this packet by the edge/core determination part 2B1, the cut-through request packet processing part 2B2 adds the open resource and traffic information of the present node device to the received cut through request packet, and transfers the packet to the node device at the downstream side.

(C-2-2) Optical Path Allocation Request Packet Processing Part 2B3'

The optical path allocation request packet processing part 2B3' of the present embodiment as well is for determining the allocation of a cut-through optical path based on the collected open resource and traffic information, and for requesting to set the cut-through optical path based on this allocation.

For example, when reception of a cut-through request packet is confirmed and the edge/core determination part 2B1 determines that the present node device is the destination side edge node device 2R for this packet, the optical path allocation request packet processing part 2B3' calculates the optimum allocation of the optical path based on the open resource information and other information like traffic flowing this node included in the packet, and notifies the cut-through optical path setting request based on the result to the present node device, the core node device 2M1 and 2M2, and the transmission side edge node device 2S. An optical path allocation request packet is used for this notice.

(C-3) Optical Path Setting Operation

As mentioned above, the content of the functions to be executed by each function part is essentially the same as that of the first embodiment, with the exception of a difference in the directions of receiving or transmitting packets related to the operation.

Therefore, except for the transfer directions of these related packets, the optical path setting operation of the present embodiment progresses in the same manner as the first embodiment. After a new cut-through optical packet, which omits the layer 2 and layer 3 processing in the core node device, is set, a transfer at high throughput and low delay time is implemented using that route (FIG. 6 (E)).

(C-4) Effect of the Embodiment

As mentioned above, in the case of the node device (node control device, optical path setting method) having a functional configuration in accordance with the present embodiment as well, a similar effect as the first embodiment is possible, that is, the load to be applied to the router 2A can be decreased dramatically by the cut through on the optical layer (layer 1) compared with a conventional system, so an improvement of throughput and a decrease of delay time can be implemented in a packet transfer. As a consequence, if this optical network system is used for Internet service, for example, the user will experience such benefits as quicker response times.

The first embodiment, where the transmission side edge node device determines the optical wavelength and setting blocks to be used for cut through, may be advantageous in the case of (1) below. However, in the case of (2) below, the present embodiment is more advantageous than the first embodiment.

(1) The amount of packets which flow into the optical network system is about the same from any transmission side edge device 2S, and load is concentrated on the destination side edge node device 2R, which is the destination of the packets. (Reason: The setting of optical wavelength and setting blocks can be processed and distributed by the transmission side edge node device 2S, where load is not concentrated.)

(2) Node device which sends the packets to the optical network system is concentrated to a specific transmission side edge node device 2S. (Reason: The setting of optical wavelength and setting blocks can be processed and distributed by the destination side node where load is not concentrated.)

(D) Third Embodiment (D-1) Functional Configuration

Figure 7:
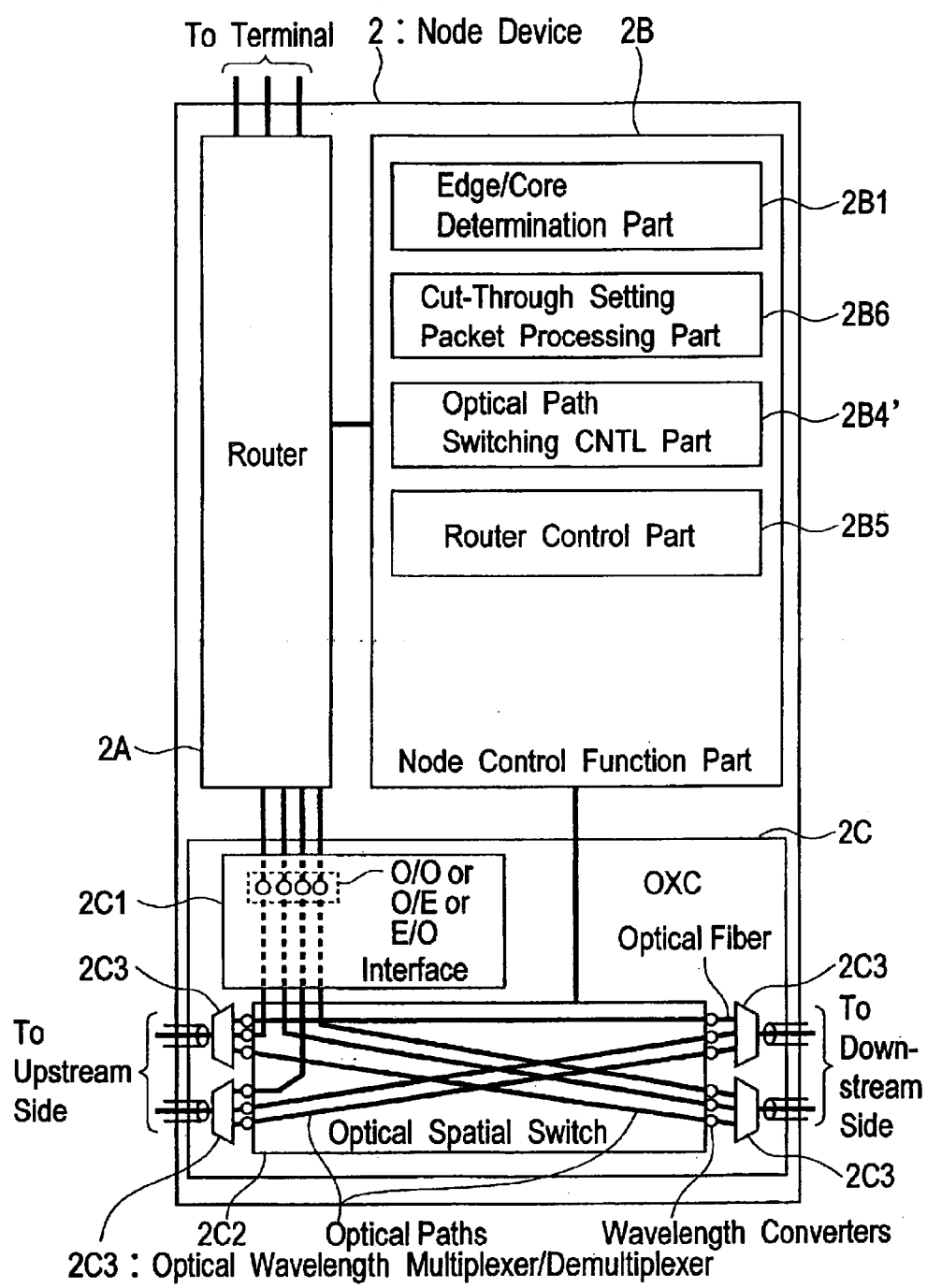
FIG. 7 is a functional block diagram depicting a third embodiment of the node device in accordance with the present invention.

Next the third embodiment will be described with reference to FIG. 7. In the third embodiment, a node device for which an optical path for cut through can be set at a higher speed than the above mentioned node device in accordance with the first and second embodiments will be described. In this node device 2 as well, the basic functional configuration is a router 2A, node control function part 2B, and an optical cross-connect 2C, which is the same as the case of the first embodiment.

The difference is the content of the function parts constituting the node control function part 2B. Therefore, in the following description, primarily the difference in configuration of the node control function part 2B will be described.

(D-2) Configuration of Node Control Function Part 2B

The node control function part 2B in accordance with the present embodiment comprises the following four function parts. Here, function parts which are the same as those of the first embodiment are denoted with the same signs, and functional parts which are different from those of the first embodiment are denoted with the corresponding sign and a prime (').

(a) Edge/core determination part 2B1

(b) Cut-through setting packet processing part 2B6

(c) Optical path switching control part 2B4'

(d) Router control part 2B5

These four functional parts 2B1, 2B6, 2B4' and 2B5 will now be described. Denoted with the same signs [as the first embodiment], the edge/core determination part 2B1 and the router control part 2B5 have the same functions as the case of the first embodiment, therefore descriptions are omitted.

(D-2-1) Cut-through Setting Packet Processing Part 2B6

The cut-through setting packet processing part 2B6, which is a configuration unique to the present invention, is a function part for setting the cut-through optical path autonomously using the optical wavelength resource notified from the downstream side, and notifying the open resource information (e.g. wavelength) of the node device to which this processing part 2B6 belongs by transferring a cut-through setting packet.

If cut through can be set using the optical wavelength resource notified from the downstream side, the cut-through setting packet transmission part 2B6 adds information on the cut-through optical path to be set to the received cut through setting packet, and transfers this packet to the node device at the upstream side.

If cut through cannot be set using the optical wavelength resource notified from the downstream side, on the other hand, the cut-through setting packet transmission part 2B6 transfers information on cut through, which has been set thus far, and open resource information in the present node device, to the node device at the upstream side together.

When the node device 2 corresponds to the destination side edge node device 2R, the cut-through setting packet transmission part 2B6, which confirmed existence of the packet which passed through the present node device, notifies existence of the packet which passed through and open resource information (e.g. wavelength) of the present node device to the node device at the upstream side as the cut-through setting packet.

(D-2-2) Optical Path Switching Control Part 2B4'

The optical path switching control part 2B4' is a functional part for actually setting the cut-through optical path for the resources for which the cut-through setting packet processing part 2B6 determined that the cut-through-optical path can be set. The optical path switching part 2B4 controls the optical cross-connect 2C and sets the cut-through optical path in the present node device.

(D-3) Optical Path Setting Operation

Next the optical path setting operation by the node device (node control device, optical path setting method) having the above mentioned functional configuration will be explained. FIG. 8 shows the status when an optical path for cut through is set on the optical network.

As FIG. 8 shows, in the case of the present embodiment, time until setting of the optical path is shorter compared with the above mentioned first and second embodiments. This is because in the case of the first and second embodiments, the open resource information of all node device on the communication route is collected at either the destination side (first embodiment) or the transmission side (second embodiment) first, then the allocation of the optical path is set based on that information. In the case of the third embodiment however, the procedure for setting of optical path allocation used for the first and second embodiment is not used, so time until the optical path setting can be decreased.

Operation of the optical path setting of each node device according to the third embodiment will now be described. In the case of the present embodiment as well, the node device 2 (transmission side edge node device 2S at the left end of FIG. 8), which received a user packet from the terminal (or access system net) having a first packet for a certain destination, transfers the packet to the node device 2M, which is the next transfer destination, according to the optical path and routing table which are currently set in the router 2A of the present node device 2S so as to start a series of operations, which are the same as the first and second embodiments.

As FIG. 8 (A) shows, the first user packet is transferred sequentially by conventional routing processing in the node device, which is selected as a transfer destination, and eventually reaches the destination side edge node device 2R.

The destination side edge node device 2R, which received the packet, outputs this user packet to the destination terminal (or access system net), but then returns the cut-through setting packet to the node device (core node device 2M2) at the upstream side from which the user packet was transferred. At this time, the open resource information on the destination side node device 2R is notified.

When the core node device 2M2 (device next to the destination side edge node device 2R at the upstream side) receives the cut-through setting packet, the core node device 2M2 determines whether the open wavelength resource exists on the next device at both the upstream side and downstream side of the present node device 2M2, and if so, the core node device 2M2 determines that cut through is possible within the present node device 2M2, sets the cut-through optical path 4a (FIG. 8 (B)), and notifies this information to the upstream node device 2M1 and the downstream node device 2R.

This notice by the cut-through setting packet notifies the next core node device 2M1 at the upstream side (second device from the destination side edge node 2R at the upstream side) that the optical path 4a is set at the downstream side. In this case, the core node device 2M1 checks whether there is a wavelength resource for setting a cut-through optical path to connect with the cut-through optical path 4a, which has already been set at the downstream side, in the upstream side of the present node device. If such a resource exists, the core node device sets a new cut-through optical path 4b in the present node device, extends the conventional cut-through optical path 4a to the next node device 2M1 at the upstream side, notifies this to the next node device 2S at the upstream side, and the cut-through optical path 4 is set.

If setting of the cut-through optical path 4b is impossible, that information is notified to the upstream node device 2M1. By repeating this, setting of the cut-through optical path 4 between both the edge node devices 2S and 2R completes when the notice reaches the transmission side edge node device 2S (FIG. 8 (C)).

In this way, the subsequent user packet to be transferred is transferred using the cut-through optical path 4, that is, a high-speed transfer omitting the layer 2 and layer 3 processing can be implemented.

(D-4) Effect of the Embodiment

As mentioned above, if the node device (node control device, optical path setting method) having a functional configuration in accordance with the present embodiment, is disposed in the optical network system, it is possible to omit the IP layer (layer 3), and therefore load to be applied to the router 2A can be dramatically decreased compared with the conventional system. In this way, improvement of throughput and a decrease of delay time in a packet transfer can be implemented.

In the case of the node device in accordance with the present embodiment, a status where cut through is possible can be implemented when the cut-through setting packet, which was output from the destination side edge node device, reaches the transmission side edge node device. This can decrease the time until setting of the cut-through optical path compared with cases of the first and second embodiments.

In the case of the first embodiment and second embodiment, however, the cut-through optical path can be set for a longer block than the case of the third embodiment, since the optical path is set after collecting all information on all core node device which relay the transfer of a packet.

(D-5) A Modification Example

The above description on the third embodiment described a configuration for sequentially setting a cut-through optical path between the downstream side node device and the upstream side node device from the downstream side node device where a cut-through setting is possible. However, it is also possible to send a cut-through setting packet from the transmission side edge node device 2S to the destination side edge node device 2R, which is the reverse of the above case, and the cut-through optical path is sequentially set from the upstream side to the downstream side as soon as this packet arrives (FIG. 9).

(E) Fourth Embodiment

Figure 10:
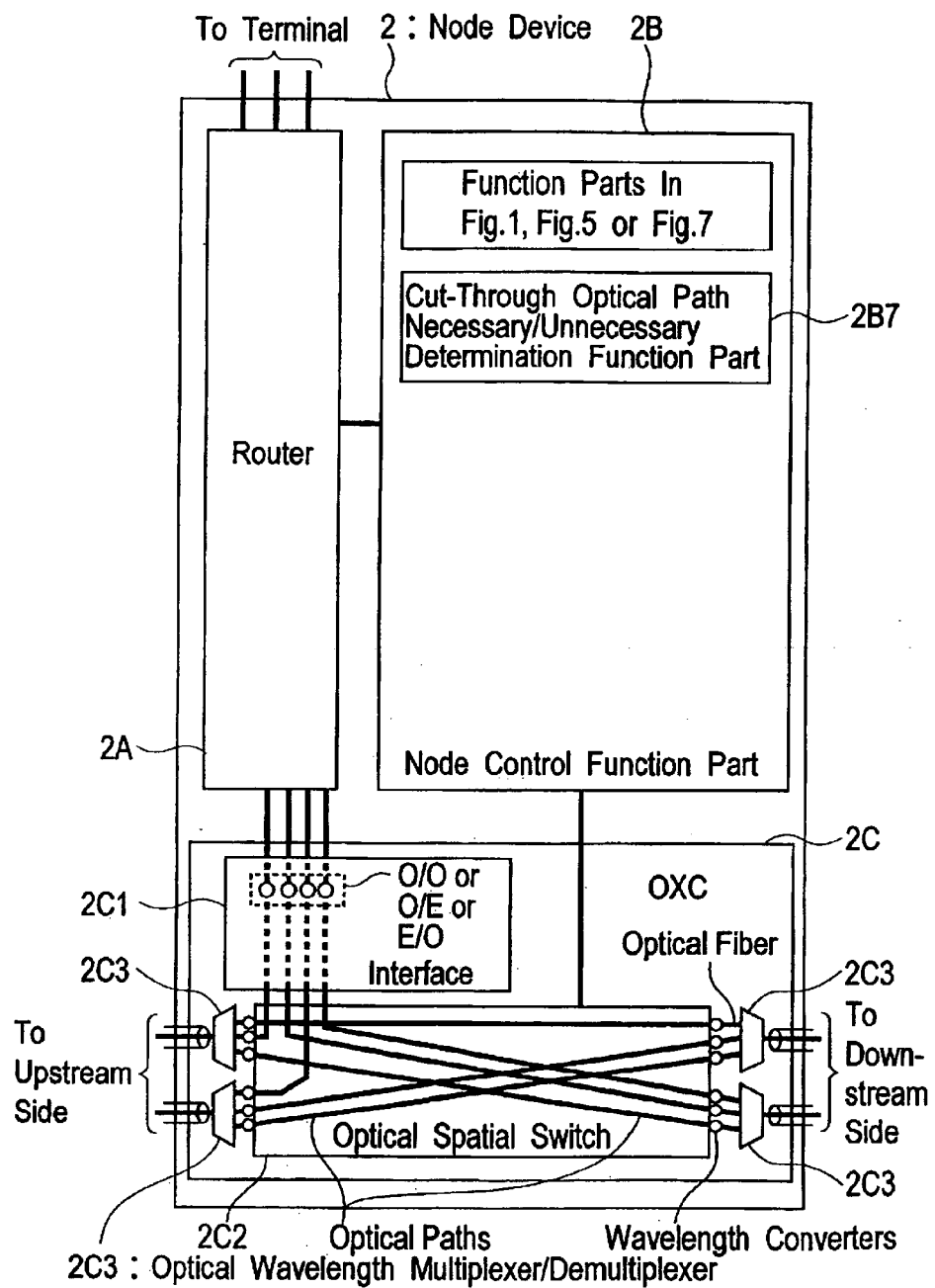
FIG. 10 is a functional block diagram depicting a fourth embodiment of the node device in accordance with the present invention.

Next the fourth embodiment will be described with reference to FIG. 10. The fourth embodiment features the following functional part which is added to the node control function part 2B mounted in the node device 2 in accordance with the above mentioned embodiments, and corresponds to a modification form of the respective above mentioned embodiments.

Here, the new functional part to be added is called the cut-through optical path necessary/unnecessary determination function part 2B7. This cut-through optical path necessary/unnecessary determination function part 2B7 determines the necessity of setting the cut-through optical path before the setting operation described in the respective above mentioned embodiments actually start, and selectively sets the cut-through optical path only when it is determined as necessary.

In the above description, the necessity of setting a cut-through optical path is determined before transmitting the cut-through setting request packet, but in the case of the first embodiment or the second embodiment, the necessity is determined before transmitting the optical path setting request packet.

Specifically, the cut-through optical path necessary/unnecessary determination function part 2B7 judges the necessity of the cut-through optical path before the edge node device transmits the cut-through request packet (first or second embodiment) or, based on the following criteria, the cut-through setting packet (third embodiment).

The criteria used here is whether it is possible that a large volume of packets having the same transmission origination address (SA) and the same destination address (DA) as a user packet having a new address transferred first, will be transferred on the optical network system in the future. This possibility is determined, not only by determining whether it is possible that a large volume of packets will flow on the same route, but also whether the packets are application packets for which the requirement for delay times is strict (real-time packets)

Only when it is determined that setting of a new cut-through optical path is necessary, the cut-through request packet (first embodiment or second embodiment) or cut-through setting packet (third embodiment) described in the respective above mentioned embodiments is allowed to be transmitted.

Determining whether a new cut-through optical path is set based on the cut-through optical path necessary/unnecessary determination function part 2B7 need not be executed by the edge node device.

In this way, if the node device (node control device, optical path setting method) having a functional configuration in accordance with the fourth embodiment is disposed on the optical network system, the cut-through optical path is set only when a new path is necessary. In other words, the cut-through optical path is set only when a highly required service for the entire network or for a certain user is provided, therefore a system which exhibits minimal waste of wavelength resources can be constructed under current optical communication technology, where the number of wavelengths is limited to several ten to several hundred.

(F) Fifth Embodiment

With the current technology, if the arrangement of optical paths is frequently changed in the optical cross-connect, time for switching optical paths is wasted, since time required for changing the setting of optical paths is longer than the speed of optical signals.

Figure 11:
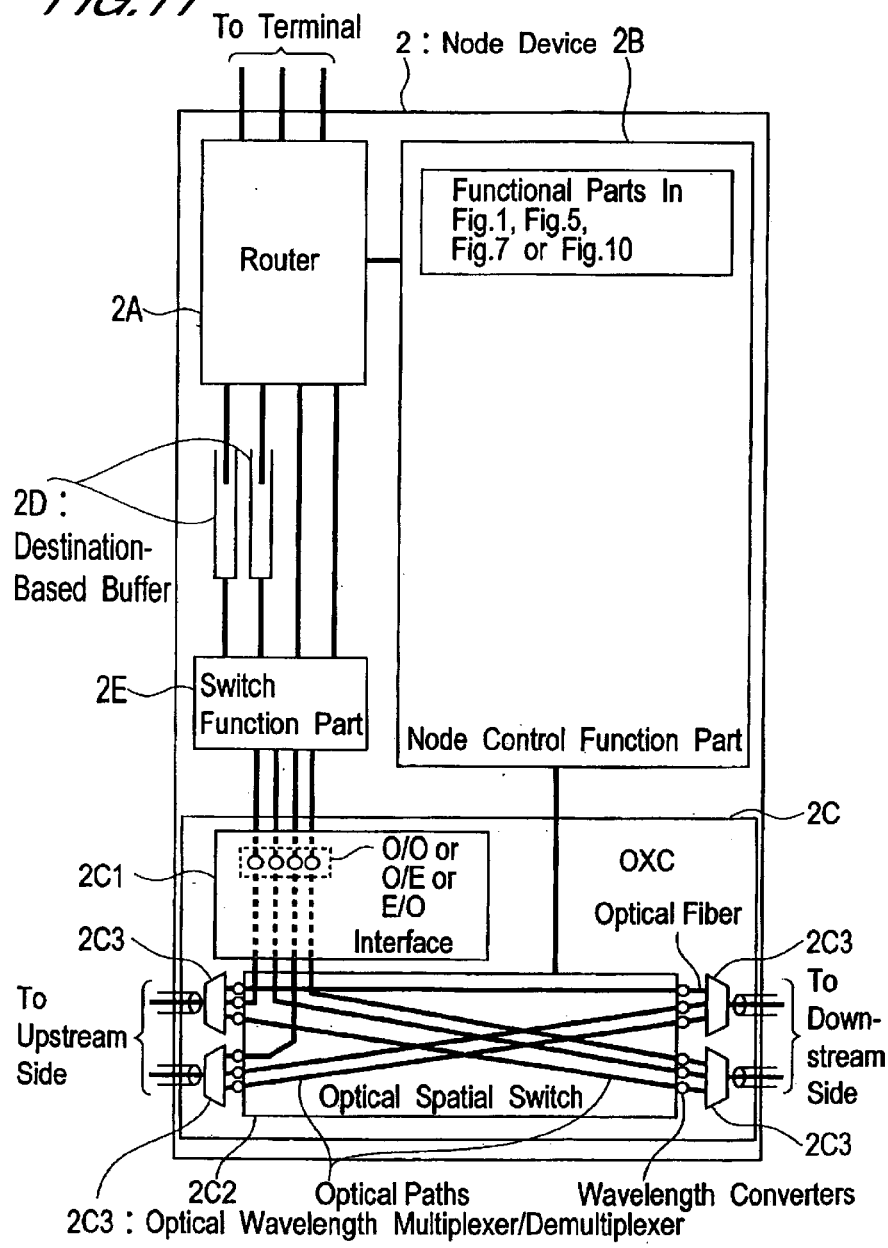
FIG. 11 is a functional block diagram depicting a fifth embodiment of the node device in accordance with the present invention.

An object of the present embodiment is implementing a node device (node control device, optical path setting method) which can use the band of the optical path as effectively as possible, and implementing an optical network system where utilization of bandwidth of the optical path is efficient. FIG. 11 shows a configuration example of a node device in accordance with the present embodiment. For the node control function part 2B, one of the node control function part 2B (FIG. 1, FIG. 5, FIG. 7, FIG. 10), described in the first to fourth embodiments, is applied.

The configuration unique to the present embodiment is characterized by that the destination-based buffer 2D is disposed at some outputs of the router 2A constituting the node device 2. In other words, data output of the router 2A is input to the optical cross-connect (optical ADM) 2C via the destination-based buffer 2D.

The destination-based buffer 2D has a switch function part 2E which allows guiding the signal read from each buffer to an arbitrary input port of the optical cross-connect 2C. This switch function part 2E can be implemented in various way, such as a function of the optical cross-connect 2C side.

Next the IP packet transfer operation, which is implemented by the node device 2 in accordance with the present embodiment, will be described. When an IP packet is sent from a terminal (or access net), the node device 2 in the present embodiment once stores the IP packet in the destination-based buffer 2D. When a number of IP packets begin to store in the destination-based buffer 2D, cut-through optical path setting processing is executed by the node control function part 2B.

When the cut-through optical path is set, the IP packets, which have been stored in the destination-based buffer 2D thus far, are all transmitted to the destination side node device. After this transmission ends, this cut-through optical path is released. After releasing, this optical path is used for the transmission of IP packets stored in another destination-based buffer 2D. A description on the cut-through optical path setting operation is omitted here, since it is the same as the operation described in the respective above mentioned first to fourth embodiments.

The destinations of the IP packets stored in the destination-based buffer 2D need not be exactly the same. Even if the final destination is different, a packet can be effectively stored in the same destination-based buffer 2D if the packet passes through the same route.

If the node device (node control device, optical path setting method) having the functional configuration in accordance with the fifth embodiment is disposed in the optical network system, a decrease of load to be applied to the router 2A and an improvement of throughput can be implemented by setting the cut-through optical path, and also a limited band of optical signals can be more effectively used.

In particular, because the currently available commercial optical switches have relatively slow switching speeds, there is a demand to minimize the overhead required for switching time, that is, a demand to setting the optical path for a period of time while accumulating a number of IP packets without frequently switching the optical path. This method effectively satisfies such demand.

(G) Sixth Embodiment

Figure 12:
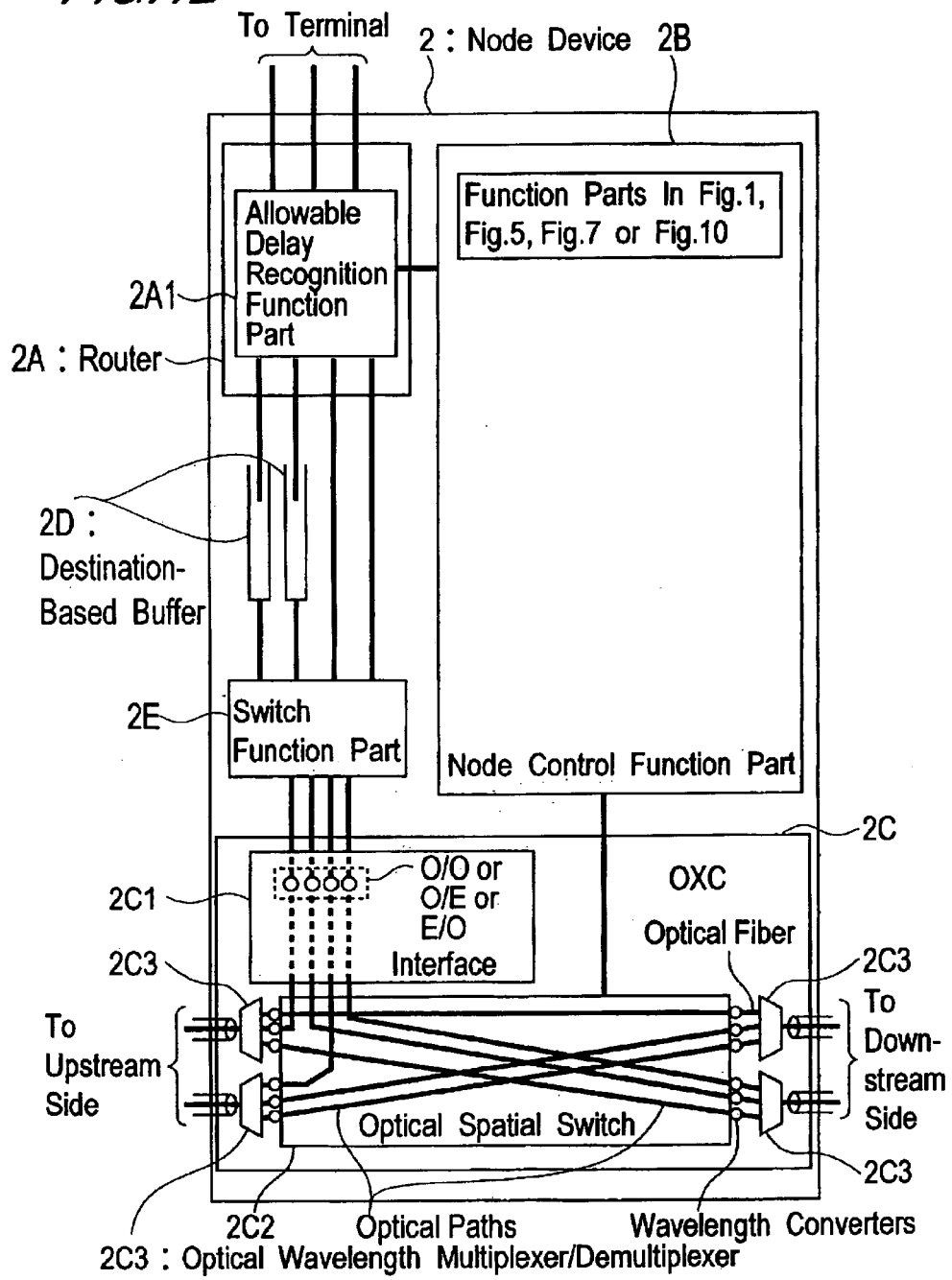
FIG. 12 is a functional block diagram depicting a sixth embodiment of the node device in accordance with the present invention.

Next the sixth embodiment will be described with reference to FIG. 12. The sixth embodiment corresponds to a modification form of the above mentioned fifth embodiment. The difference between the sixth embodiment and the fifth embodiment is that in the case of the sixth embodiment, an allowable delay recognition function part 2A1 is newly disposed in the router 2A constituting the node device 2. The allowable delay recognition function part 2A1 functions primarily at the transmission side edge node device.

This function part is provided for the purpose of adaptively preventing the occurrence of problems which may occur when the fifth embodiment is used alone. In other words, in the case of the fifth embodiment, an improvement of throughput and effective use of band are possible, but the delay time may become a problem. For example, in the case of packets of real-time system applications, such as an Internet TV telephone, service quality may drop if packets are stored for a predetermined time or longer.

In the node device in accordance with the present embodiment, the allowable delay recognition function part 2A1 of the router 2A first determines whether the current transfer target packet is a packet of a real-time system application such as an Internet TV telephone, or a packet of a non-real-time system application such as a file transfer. As a result of this determination, a packet transfer using the destination-based buffer 2D is selected only for the packet determined as the latter.

The node device in accordance with the present embodiment transfers a packet of a non-real-time system application (a packet to be stored in the destination-based buffer 2D) via the cut-through optical path, which is set in the optical layer (layer 1) when a certain number of packets accumulate (or by an event based on a certain time interval). Here, for the optical path to be used for a transfer of this packet, an optical path, where priority is assigned for efficient bandwidth utilization (an optical path which is set such that the number of cut-throughs become a maximum), for example, is used.

Another method is, for example, that some destination-based buffers are used for storing packets which cannot be delayed too long, and the packets stored in the buffers are output before the delay time becomes too long.

In this way, if the node device (node control device, optical path setting method) having the functional configuration in accordance with the sixth embodiment is disposed in the optical network system, packets of a real-time system application can be transferred without being delayed in a queue in the destination-based buffer, and has the features of the fifth embodiment as well.

(H) Seventh Embodiment

Generally speaking, and as mentioned in the above, the first to fourth embodiments are methods combining the basic concept, which is the dynamic allocation of an optical path and flow driven type multi-layer switch in an IP/ATM system, as mentioned above. However, the resource environment assumed in IP/ATM and the resource environment assumed in IP/Lightwave, which is described in the present description, are not always the same.

For example, in the case of IP/ATM, communication with an adjacent node device is insured if one logical channel is free, since ATM can set channels logically on a physical network.

In the case of IP/Lightwave, on the other hand, the method used for ATM cannot be used for a logical channel for an information transfer which has a narrow band, since the number of optical paths is restricted by the number of optical wavelengths multiplexed. Therefore, if all optical paths are allocated to omit the layer 2 and layer 3 processing in a node device of an optical network, this node cannot communicate with other node device.

If at least one optical path is free to communicate with another node device, it is certainly possible to communicate with any node device by using that optical path by repeatedly hopping. However, in this case, a large load is applied to the optical path.

In the node device in accordance with the present embodiment, it is proposed to dispose a function part for executing control to always keep free an optical path to be used as an information channel between the present node device and another node device. This function part is called an information channel insuring confirmation function part 2B8.

Figure 13:
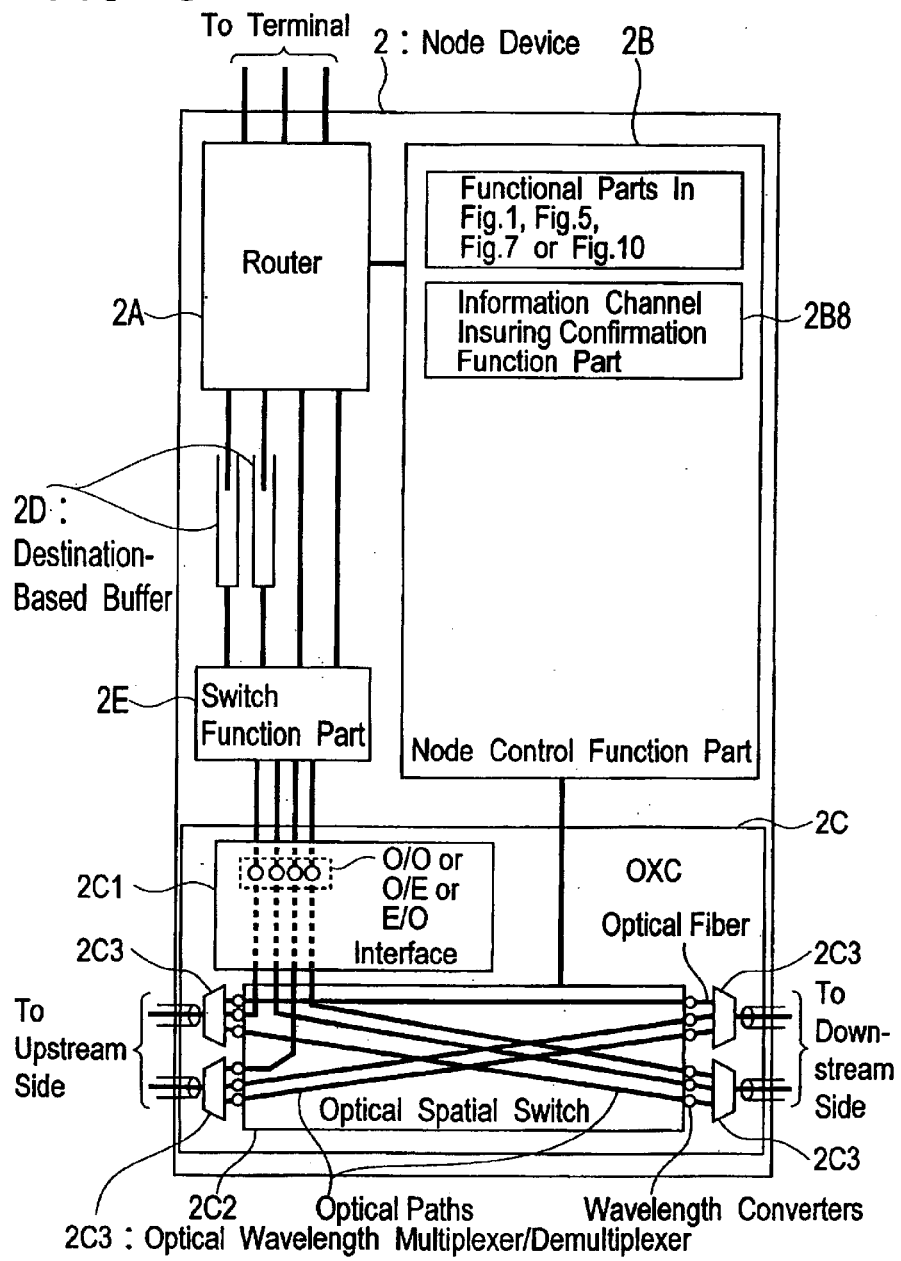
FIG. 13 is a functional block diagram depicting a seventh embodiment of the node device in accordance with the present invention.

FIG. 13 shows a configuration example of the node device in accordance with the present embodiment. An information signal processing function part for exchanging information signals with another node device is disposed in the node control function part 2B, although the information signal processing function part is not illustrated in FIG. 13 (or in other drawing). Disposition of the information signal processing function part is the same for the above mentioned and later mentioned embodiments.

Although FIG. 13 shows a configuration where the information channel insuring confirmation function part 2B8 is added to the node device in accordance with the above mentioned sixth embodiment, it is certainly possible to apply the information channel insuring confirmation function part 2B8 in accordance with the present embodiment to each node device in accordance with the first to fifth embodiment.

Next the setting of a cut-through optical path by the node device having such a configuration will be described. When the node device 2 receives a request to omit the layer 2 and layer 3 processing by the optical layer (layer 1), the node device 2 confirms the existence and appropriateness of the open wavelength source of the present node device by function part of the node control function part 2B, and determines whether cut through is possible.

When the setting of the cut-through optical path is possible and the optical path is actually set, the node device 2 determines whether an information channel required for communication between the present node device and another node device is free by the information channel insuring confirmation function part 2B8. If it is confirmed that a required information channel is free, the node device 2 actually executes switching to the optical path.

A general data packet can also be transferred to the optical path for an information channel insured in this manner. It is easiest to set this information channel between the present node device and an adjacent node device, but this approach is not an absolute. Even if some packet transfers are necessary (using a longer route), required information (packet) can reach its destination via the insured information channel.

As mentioned above, if the node device (node control device, optical path setting method) in accordance with the present embodiment is disposed in the optical network system, an information channel can always be insured between adjacent nodes, in addition to the effects of the respective above mentioned embodiments. Therefore such communication as releasing the setting of an optical path can always be directly executed.

(I) Eighth Embodiment

Figure 14:
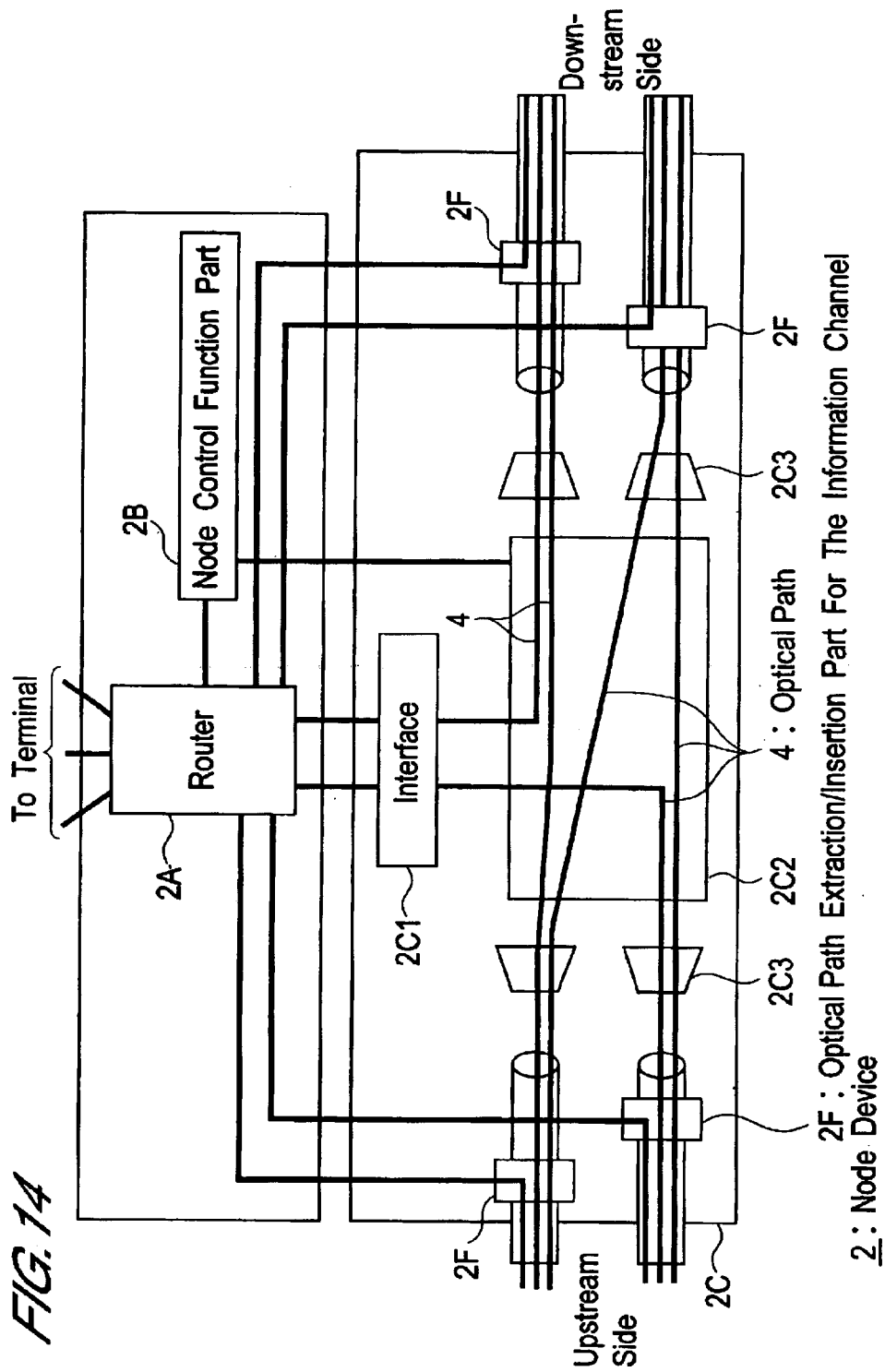
FIG. 14 is a functional block diagram depicting an eighth embodiment of the node device in accordance with the present invention.

Next the eighth embodiment will be described with reference to FIG. 14. The above mentioned seventh embodiment is a configuration example based on a technical concept only to insure an information channel. Whereas in the present embodiment, which is a node device which sets a dedicated optical path in advance for an information channel, that is, allocates a certain optical wavelength dedicated to an information channel, so as to insure releasing the setting of the cut-through optical path, will be described.

To implement such a function, in the case of the node device 2 in accordance with the present embodiment, an optical path extraction/insertion (drop/add) part for the information channel 2F to extract (drop) optical signals with a specified wavelength from the optical fiber 3 or insert (add) optical signals with a specified wavelength into the optical fiber 3, is disposed in the node device.

The optical path extraction/insertion (drop/add) part for the information channel 2F functions in some cases as a means for extracting (dropping) optical signals for the information channel, which were transferred from another node device, from the optical fiber 3, and functions as a means for inserting (adding) optical signals for the information channel to another node device.

In other words, the optical path extraction/insertion (drop/add) part for the information channel 2F extracts (drops) an optical signal with a specified wavelength from the optical fiber 3, transfers the optical signal to the router 2A and guides the optical signal to the information signal processing function part (in the node control function part 2B) which processes information conveyed on the optical signal. The optical path extraction/insertion (drop/add) part for the information channel 2F also receives the information which the information signal processing function part (in the node control function part 2B) addressed to another node device via the router 2A, and inserts (adds) the optical signal with a specified wavelength, where this information is conveyed, to the optical fiber 3.

The basic operations of the cut-through optical path setting procedures, and the user packet transfer procedure, are the same as the cases of the other embodiments.

In this way, if the node device (node control device, optical path setting method) in accordance with the present embodiment is disposed in the optical network system, an information channel required for the transfer of information for switching of an optical path can be absolutely and physically insured.

(J) Ninth Embodiment

Figure 15:
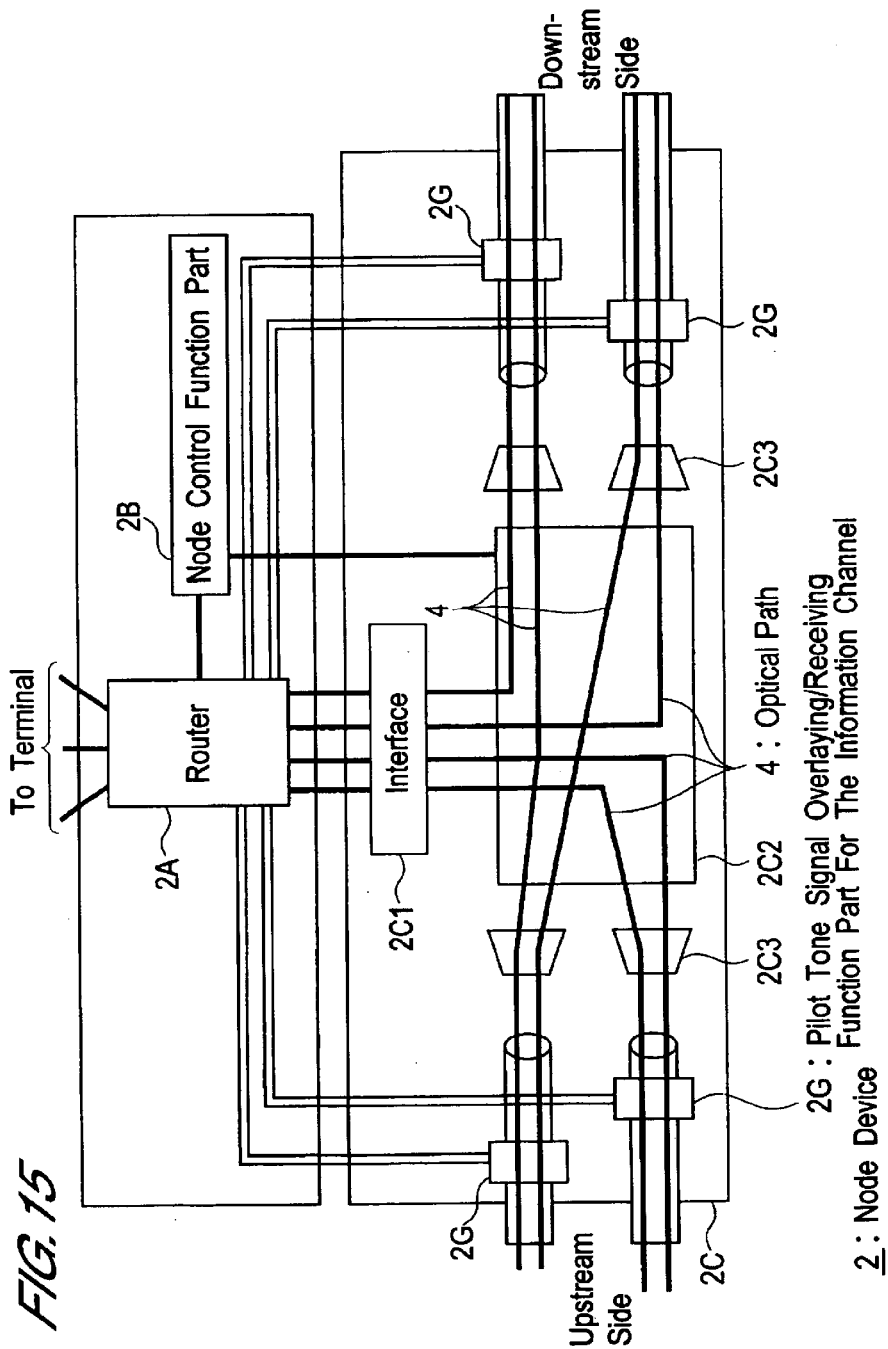
FIG. 15 is a functional block diagram depicting a ninth embodiment of the node device in accordance with the present invention.

Next the ninth embodiment will be described with reference to FIG. 15. Unlike the above mentioned eighth embodiment, in the ninth embodiment, a dedicated optical path for the information channel is not set in advance, instead a pilot tone signal is overlaid on the normal cut-through optical path for user data so as to insure the information channel at all times.

The node device 2 in accordance with the present embodiment implements this function by the pilot tone signal transmission function part 2G disposed in the node device. By this function, information can be exchanged between adjacent nodes (or nodes slightly distant from each other), even if all or almost all optical paths in a node device 2 are set to the cut-through optical paths.

A certain effect can be expected when the present method is applied as is, but if a plurality of node device on the same path transmit pilot tone signals at the same time, a collision of pilot tone signals may occur at the node device furthest downstream, and transmitted information may not be received.

Therefore in the present embodiment, it is more effective to add the following means. For example, the pilot tone signals are transmitted in bursts only when information is transmitted. In this case, even if transmitted information cannot be received due to a collision of pilot tone signals, the node device furthest downstream can request a resend using the idle time of the information channel. Another example is predetermining to always reply an acknowledgment (ACK) to the transmission side whenever information is received normally, so that information is automatically resent if the acknowledgment (ACK) is not returned.

In this case, the probability of an occurrence of collisions can be further decreased if the node device at the upstream side executes a resend at different timing by some means (e.g. determining a time until a resend by random numbers).

If the node device (node control device, optical path setting method) in accordance with the present embodiment is disposed in an optical network system, an information exchange between adjacent node device (including node device slightly distant from each other) becomes possible, even if all or almost optical paths pass through the node device without layer 2 or layer 3 processing.

(K) Tenth Embodiment

Figure 16:
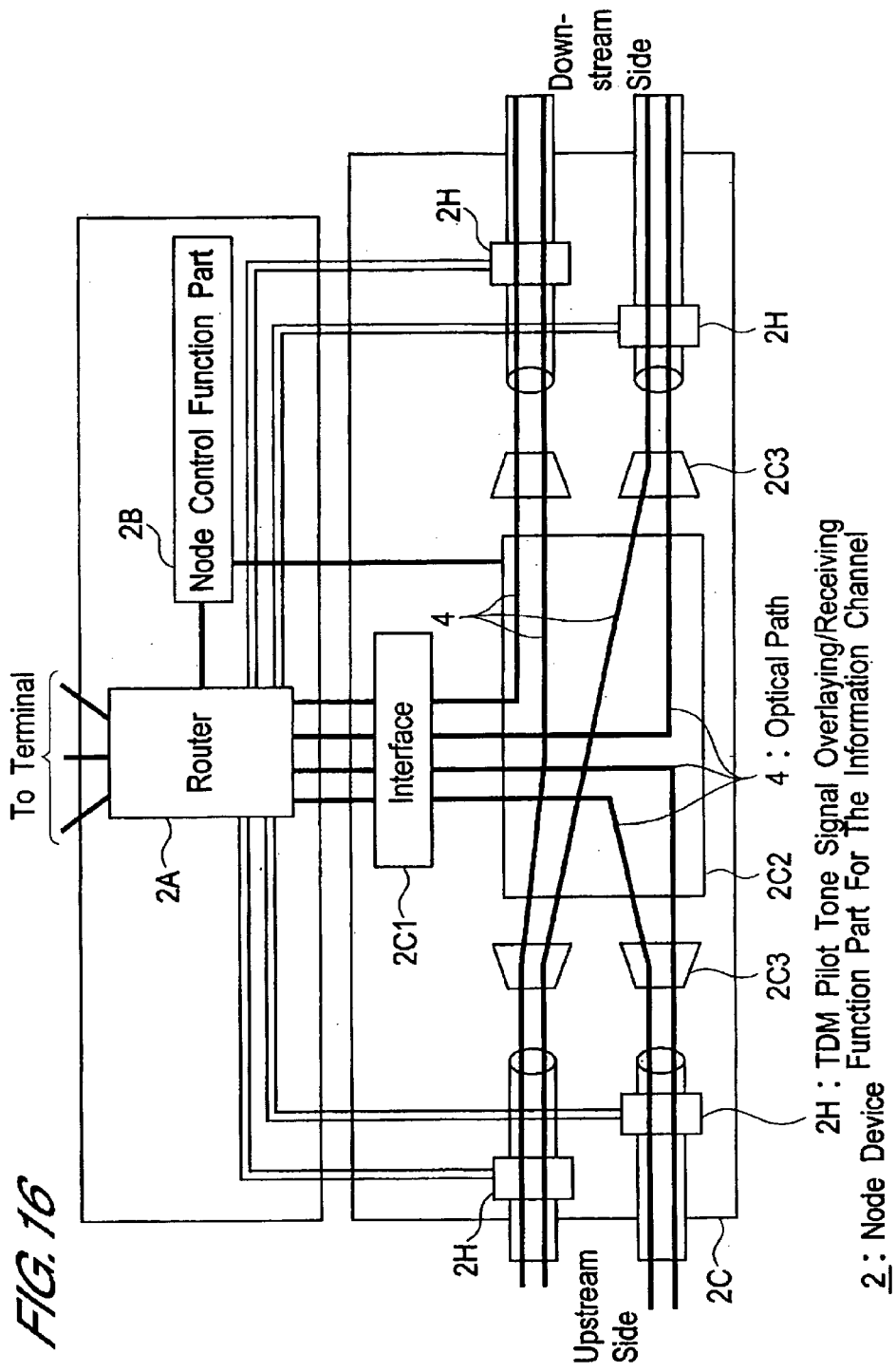
FIG. 16 is a functional block diagram depicting a tenth embodiment of the node device in accordance with the present invention.

Next the tenth embodiment will be described with reference to FIG. 16. Unlike the above mentioned ninth embodiment, in the present embodiment, an information channel is insured by time division multiplex (TDM) of pilot tone signals on a normal cut-through optical path for user data.

Figure 17:
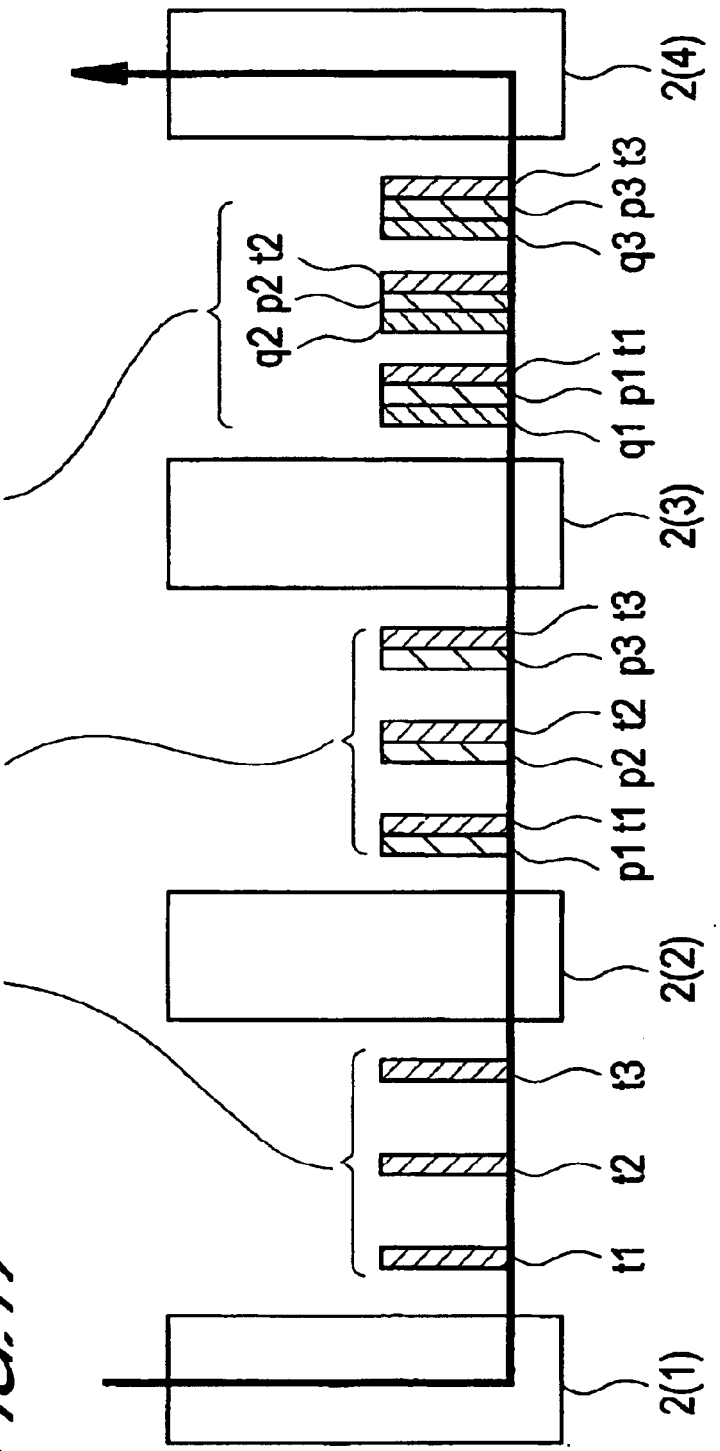
FIG. 17 is a drawing depicting an example of overlaying pilot tone signals in accordance with the tenth embodiment of the present invention.

The node device 2 in accordance with the present embodiment implements this function by TDM pilot tone transmission function part 2H for the information channel which is disposed in the node device. FIG. 17 shows an example of time division multiplex (TDM) of pilot tone signals. In FIG. 17, with reference to time slots t1, t2 and t3 when the node device 2 (1) furthest upstream transmitted pilot tone signals, the node devices 2 (2), 2 (3) and 2 (4) in subsequent stages overlay respective information in different time slots (P1, P2, P3; q1, q2, q3) respectively.

For synchronization, the synchronous circuit used for receiving the pilot tone signals can be used as is. Cross-talk clearly does not occur on different optical paths, even if pilot tone signals with the same frequency are used.

In this way, if the node device (node control device, optical path setting method) in accordance with the present embodiment is disposed in the optical network system, information can be transferred without a collision of pilot tone signals occurring.

In the present embodiment, a TDM system is used for the transmission of pilot tone signals, but a transmitter-receiver for pilot tone signals with different frequencies may be provided in each device, so as to enable communication between the node devices by the transmitter-receivers. Here, as a rule, a different frequency for a pilot tone signal is assigned to each node device. However, if a pilot tone signal from another node device received by a node device which distance is sufficiently distant, is noticeably weak, the same frequency may be used in an appropriate spatial arrangement.

(L) Other Embodiments

In the above mentioned embodiments, the case when the layer 3 switch, where packets are transferred at high-speed based on the layer 3 (network layer) address of the input packet, was described for the node device 2, but the present invention can also be applied to the layer 4 switch where the header information of the layer 4 (transport layer) of the input packet, such as the port numbers of TCP and UDP, is read to transfer packets. In this case, processing for the layer 3 or layers higher than the layer 3 is omitted.

(M) Still Other Embodiments

In the above embodiments, the node device itself judges whether the self node device is at the transmission side or destination side edge node or core node device before executing the processing required for setting an optical path. To decrease cost to construct an optical network system, however, it is preferable that the node device have such a configuration that judging the role of the self node device is unnecessary. In other words, it is preferable, in terms of construction cost, to provide an optical network system by providing a node device where the edge node device and core node device are designed as dedicated for the respective edge node and core node.

Figure 18:
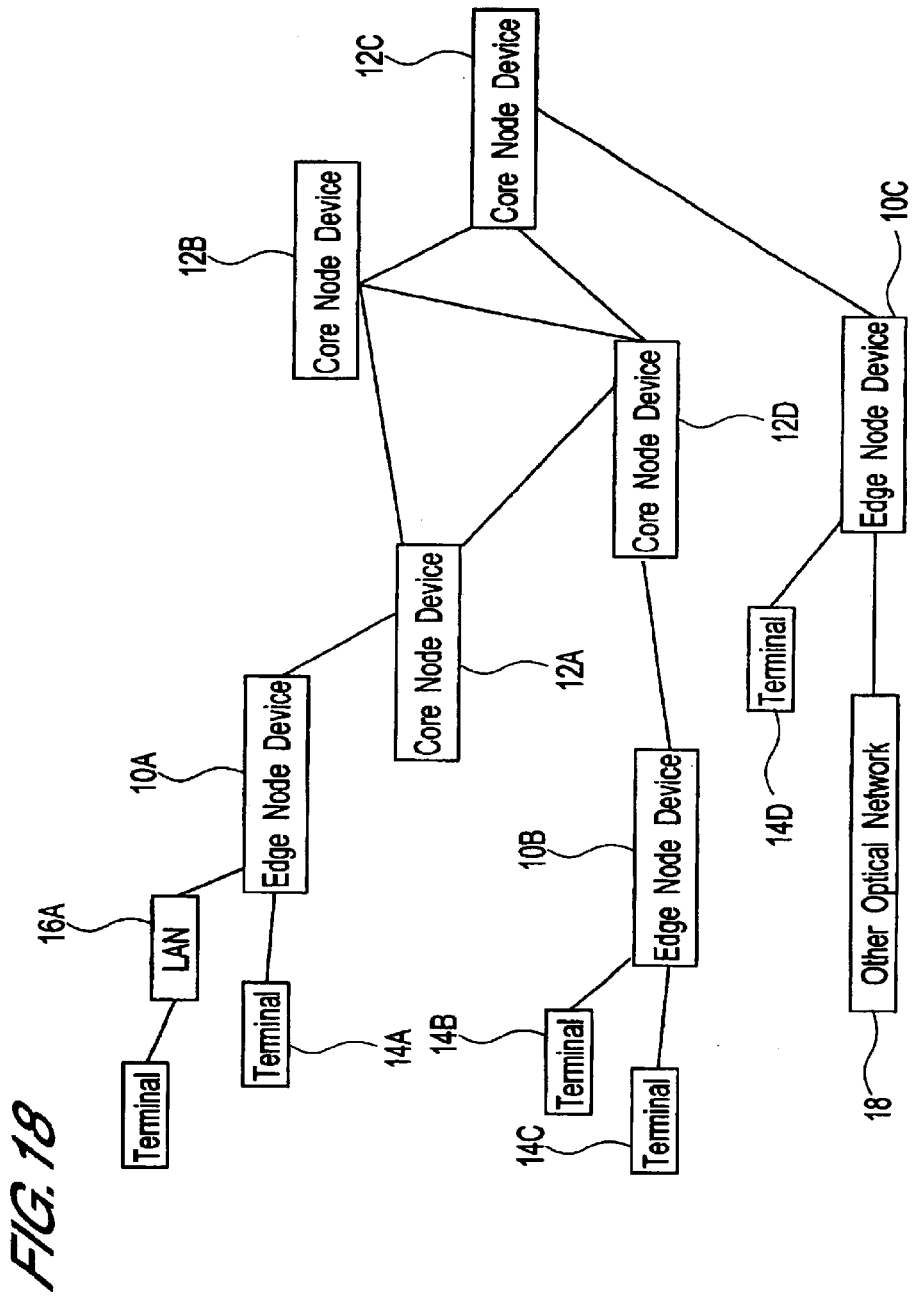
FIG. 18 is a drawing depicting an example of a net where an optical network system is comprised of dedicated node devices.

FIG. 18 is a drawing depicting an example of a net where the optical network system is comprised of such dedicated node devices. In the configuration example in FIG. 18, the optical network is comprised of three edge node devices 10A, 10B and 10C (these edge node devices are collectively denoted by 10) and four core node devices 12A, 12B, 12C and 12D. The terminal 14A, LAN 16A and the core node device 12A are connected to the edge node device 10A. The terminals 14B, 14C and the core node device 12D are connected to the edge node device 10B. The terminal 14D, another network 18, and the core node device 12C are connected to the edge node device 10C. The core node device 12A is connected to the core node devices 12B and 12D respectively via optical fibers. The core node device 12B is connected to the core node devices 12D and 12C respectively via optical fibers, and the core node device 12C is connected to the edge node device 10C via optical fibers. The core node device 12D is connected to the edge node device 12B via optical fibers.

In the configuration example of this optical network system, an edge node device is connected only between an external terminal and a core node device. A core node device is connected only with one or both of an edge node device and another core node device. Therefore, a core node device has core node input/output ports to forward transfer packets with another core node device, but does not have input/output ports to forward transfer packets with an external terminal. The transfer packets include a user packet and a control packet.

Figure 19:
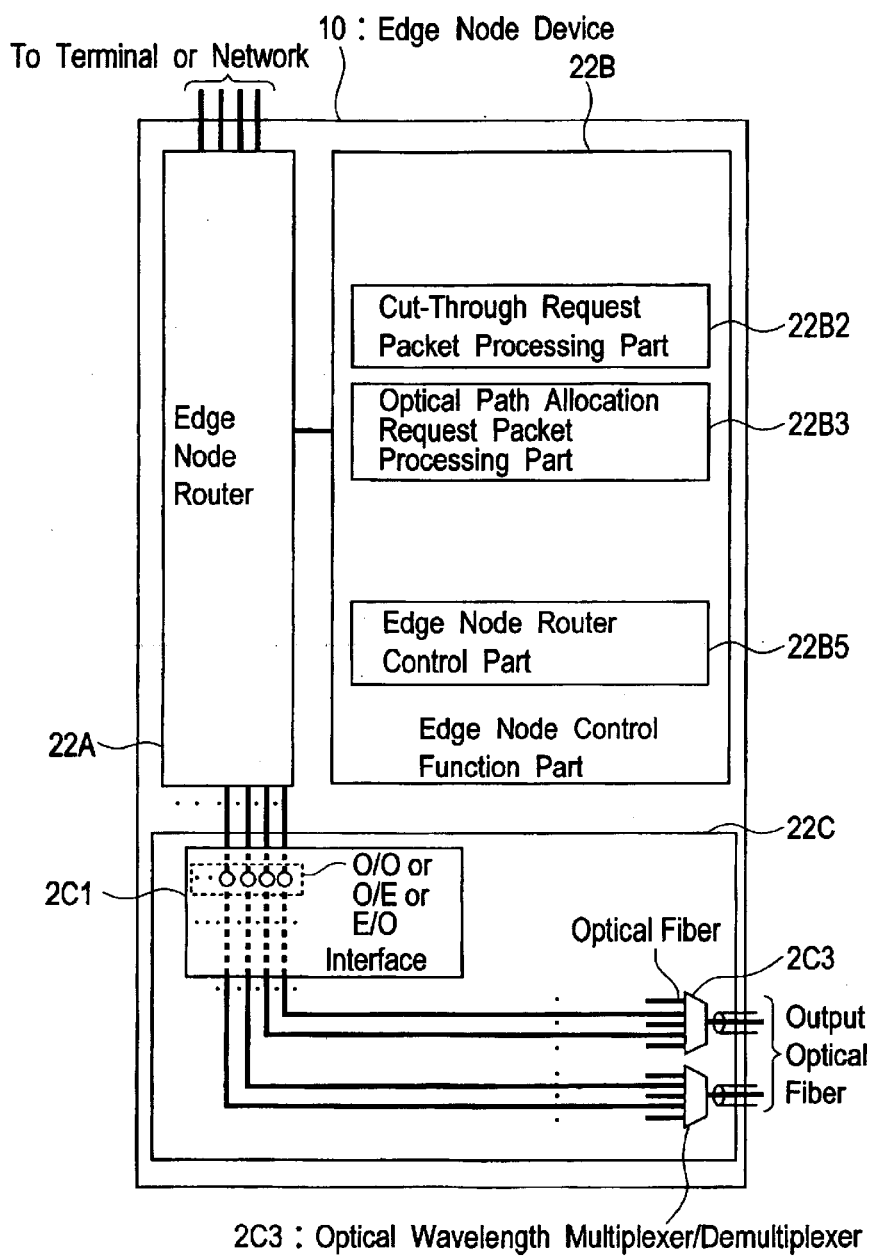
FIG. 19 shows a configuration example of an edge node device dedicated to an edge.

The edge node device 10 dedicated to the edge is configured such that the edge/core judgment part 2B1 and the optical path switching control part 2B4 are omitted from the configuration of the node control part of the general edge node device 2, that is, the node control device 2B, which is described with reference to FIG. 2, and the optical transmission device, that is, a simple input/output part, is used instead of the optical cross-connect 2C. FIG. 19 shows a configuration example of the edge node device 10 dedicated to the edge. In FIG. 19, the same components as in FIG. 2 are denoted with the same reference characters. However, the edge node control function part, which corresponds to the node control device 2B in FIG. 2, is denoted with 22B, the input/output part is denoted with 22C, and the edge node router is denoted with 22A.

The input part 22C has edge node input/output ports to forward transfer packets between the edge node device which includes this input part 22C and a core node device. These edge node input/output ports are comprised of an optical wavelength multiplexer/demultiplexer 2C3. And these input/output ports 2C3 are connected to the router 22A via the interface 2C1. The transfer packets include a user packet and a control packet.

The edge node router 22A has input/output ports for connection with an external terminal or LAN or another network. The edge node router 22A determines the output destination of the transfer packet which was input from the input/output ports according to the header information of layer 2 and layer 3, and outputs the output destination to the input/output part 22C.

The edge node control function part 22B controls the decision of the output destination in the router 22A according to the instruction of the transfer packet which was input thereto. Or, the edge node control function part 22B outputs the packet which was input from the input part 22C to an appropriate terminal interface.

The above mentioned transfer packets include a user packet and a control packet.

The edge node control function part has a cut-through request packet processing part 22B2, an optical path allocation request packet processing part 22B3, and an edge node router control part 22B5.

When a transfer packet from a transmission origination edge node device is input, the cut-through request packet processing part 22B2 notifies the open resource information in the self edge node device to the transmission origination edge node device as a cut-through request packet.

When the cut-through request packet from the destination side edge node device is input, the optical path allocation request packet processing part 22B3 decides an optimum optical path allocation based on the open resource information written in the cut-through request packet, and notifies the allocation to the core node device and the destination side edge node device as the optical path allocation request packet.

When a cut-through optical path is set in the core node device and the destination side edge node device, the edge node router control part 22B5 controls the edge node router 22A so that transfer packets are transferred via this cut-through optical path.

Figure 20:
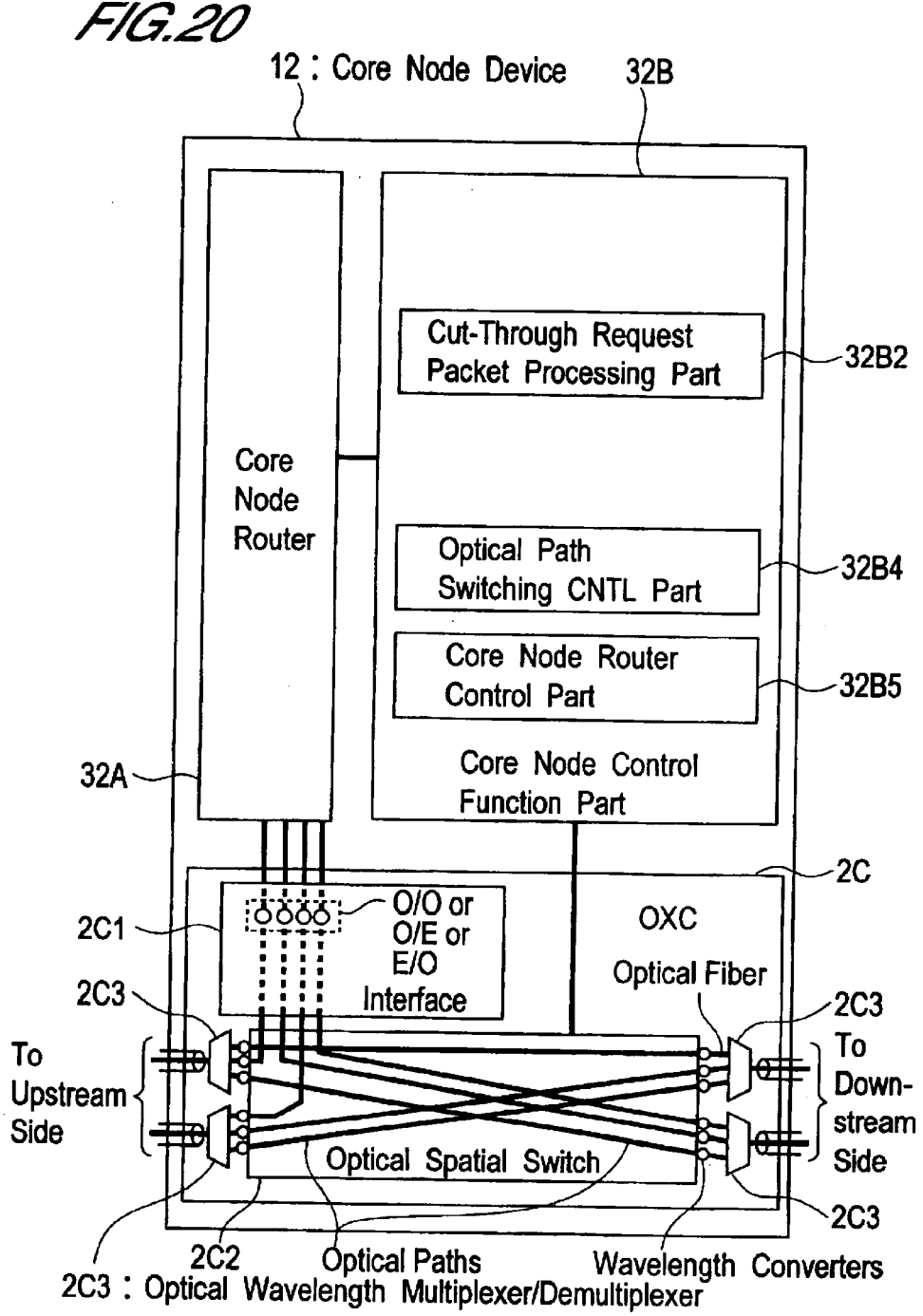
FIG. 20 shows a configuration example of another edge node device dedicated to an edge.

In the same manner, a core node device 12 dedicated to the core is configured such that the edge/core judgment part 2B1 and the optical path allocation request packet processing part 2B3 are omitted from the configuration of the node control part of the general edge node device 2, that is, the node control device 2B which was described with reference to FIG. 2. FIG. 20 shows a configuration example of the edge node device 12 dedicated to the edge. In FIG. 20, the same components as the components in FIG. 2 are denoted with the same reference characters. However, the core node control function part, which corresponds to the node control device 2B in FIG. 2, is denoted with 32B, and the core node router is denoted with 32A.

The core node device 12 has core node input/output ports to forward the transfer packets with an edge node device or with another core node device, and has an optical cross-connect 2C for setting an optical path between input/output ports of this core node. In the configuration example in FIG. 19, the core node input/output ports are comprised respectively of an optical wavelength multiplexer/demultiplexer 2C3, which constitutes a part of the optical cross-connect 22C.

The core node router 32A decides the output destination of the transfer packet which was input from the core node input/output part 2C3 according to the header information of layer 2 and layer 3, and outputs the output destination to the core node input/output part 2C3.

The user packets which are input to the same node device pass through only the optical cross-connect via the optical path, or are transferred to a router and is routed to an appropriate output destination in the router.

For a control packet, the core node control function part 32B decides the output destination in the core node router 32A according to the instruction of the control packet which was input, and controls the switching of a connected pair of each input port and output port inside the optical cross-connect 2C.

The core node control function part 32B has a cut-through request packet processing part 32B2, an optical path switching control part 32B4, and a core node router control part 32B5.

The cut-through request packet processing part 32B2 adds an open resource information in the self core node device to the cut-through request packet which is received from the upstream side or is independently generated and transfers the packet to the upstream side.

The optical path switching control part 32B4 sets a cut-through optical path in the optical cross-connect 2C according to the instruction of the optical path allocation request packet notified from the edge node device.

When a cut-through optical path is set in a core node device and a destination side edge node device, the core node router control part 32B5 controls the core node router 32A so that the transfer packet is transferred via this cut-through optical path.

In the case of the optical network system having the configuration shown in FIG. 18, the function of the router is not always necessary, but only the optical cross-connect can create a state where an optical path from an edge node to another edge node is always set. In this case, control can be executed by control signals (control packet), for example, which are sent by a pilot tone.

What is claimed is:

1. A device which is used in an optical network system for transferring a user packet, which is input to said optical network system from outside said optical network system, to outside said optical network system through a plurality of said devices, which are sequentially provided from an upstream side to a downstream side of a transfer route, the device comprising:

a router;

an optical switch; and a node control device, wherein said node control device may function as a transmission side edge node device, a core node device, and a destination side edge node device, said node control device comprising:

an optical path allocation request packet processing means for
- (1) transferring a first open resource information of said destination side edge node device as an optical path allocation request packet to said transmission side edge node device through said core node device on the upstream side of the transfer route, when said node device functions as said destination edge node device, and
- (2) adding a second open resource information of said core node device to said optical path allocation request packet received from said destination side edge device on the downstream side of the transfer route and transferring it to another node control device on the upstream side of the transfer route, when said node control device functions as said core node device;

an optical path allocation packet processing means for
- (b1) selecting open resource information capable of determining the allocation of an optical path, which can pass through said core node device without going through the router therein, based on said first and second open resource information received from said core node device on the downstream side of the transfer route, when said node device functions as said transmission side edge node device, and
- (b2) notifying the allocation of the optical path to said core node device relating to the selected open resource information, using an optical path allocation packet; and an optical path switching means for
- (c1) controlling said optical switch according to said optical path allocation packet to set said optical path which does not go through said router, when said node device control functions as said core node device, and
- (c2) outputting an optical path setting completion notice packet to notify of completion of the optical path setting to said transmission side edge node device.

2. The node device according to claim 1, wherein said node control device further comprises:

a forced releasing means for forcibly releasing the optical path when a predetermined time has elapsed since setting of the optical path or when a decrease in a number of communication packets is confirmed at the node device positioned at both ends of said optical path.

3. The node device according to claim 1, wherein said node control device further comprises:

an optical path determination means for determining the necessity of the setting of the optical path before transmitting the optical path allocation request packet or transmitting the optical path allocation packet, and selectively setting the optical path only when necessary.

4. The node device according to claim 1, wherein said node control device further comprises:

an information channel insuring means for determining whether an information channel is continuously insured after setting the optical path between the node devices on the transfer route where the optical path is set before transmitting the optical path allocation request packet or transmitting the optical path allocation packet, and setting the optical path only when the information channel is insured.

5. The node device according to claim 1, further comprising:

an optical cross-connect having input ports and output ports for one of extracting optical signals from an optical fiber or inserting optical signals to an optical fiber, and relaying optical signals between arbitrary input/output optical fibers for optical path setting; wherein said router receives a transfer packet based on header information and determines the output destination of the transfer packet; and wherein said node control device switches a connected pair of each input port and output port inside said optical cross-connect according to instructions of the received transfer packet or based on self judgment.

6. The node device according to claim 5, further comprising a switch to connect a destination-based buffer to at least one of the outputs from said router to said optical crossconnect, and to connect a packet read from said destination-based buffer to at least one of said input ports of said optical cross-connect.

7. The node device according to claim 6, further comprising:

an allowable delay recognition function means provided in said router for determining an allowable delay of said user packet, so that only user packets having a large allowable delay are allowed to be output to said destination-based buffer and user packets having a small allowable delay are directly output to said optical cross-connect.

8. The node device according to claim 5, further comprising:

an optical path extraction/insertion means provided in said optical cross-connect for an information channel for extracting optical signals with a fixed wavelength insured for the information channel from the optical fiber, or for inserting said optical signals with a fixed wavelength into the optical fiber, for communicating information signals with another node device.

9. The node device according to claim 5, further comprising:

a pilot tone signal transmission means provided in said optical cross-connect for an information channel for overlaying pilot tone signals for the information channel on an optical path for user data or separating pilot tone signals for the information channel from the optical path for user data for communication of information signals with another node device.

10. A node device which is used in an optical network system for transferring a user packet, which is input to said optical network system from outside said optical network system, to outside said optical network system through a plurality of said node devices, which are sequentially provided from an upstream side of a transfer route to a downstream side thereof and which function as a transmission side edge node device, a core node device and a destination side edge node device, respectively, the node device comprising:

a router;

an optical switch; and a node control device that may function as one of said transmission side edge node device, said core node device, and said destination side edge node device, said node control device comprising;

(1) an optical path allocation request packet processing means for
   (a1) transferring a first open resource information of said node control device as an optical path allocation request packet to said destination side edge node device through said core node device on the downstream side of the transfer route, when said node control device functions as said transmission edge node device, and
   (a2) adding a second open resource information of said control node device to said optical path allocation request packet received from said transmission side edge device on the upstream side of the transfer route and transferring it to another node control device on the downstream side of the transfer route when said node device functions as said core node control device;

(2) an optical path allocation packet processing means for
   (b1) selecting open resource information capable of determining the allocation of an optical path, which can pass through said core node device without going through the router therein, based on said first and second open resource information received from said core node device on the upstream side of the transfer route, when said node control device functions as said destination side edge node device, and
   (b2) notifying the allocation of the optical path to said core node device relating to the selected open resource information, using an optical path allocation packet; and (3) an optical path switching means for
   (c1) controlling said optical switch according to the notified optical path allocation packet to set said optical path which does not go through said router, when said node control device functions as said core node device, and
   (c2) outputting an optical path setting completion notice packet to notify the completion of the optical path setting to said transmission side edge node device.

11. A node device which is used in an optical network system for transferring a user packet, which is input to said optical network system from outside said optical network system, to outside said optical network system through a plurality of said node devices, which are sequentially provided from an upstream side to a downstream side of a transfer route and which function as a transmission side edge node device, a core node device, and a destination side edge node device, respectively, the node device comprising:

a router;

an optical switch; and a node control device that may function as one of said transmission side edge node device, said core node device, and said destination side edge node device, said node control device comprising:

(1) an optical path allocation packet processing means for
   (a1) transferring a first open resource information of said node control device as an optical path allocation packet to said transmission side edge node device through said core node device on the upstream side of the transfer route, when said node control device functions as said destination edge node device, and
   (a2) determining a possibility of setting an optical path in said core node device relating to said first open resource information presented in said optical path allocation packet received from said destination side edge node device on the downstream side of the transfer route, when said node control device functions as said core node device, thereby
   (a2-1) adding an optical path set table information to said optical path allocation packet and transferring it with the added set table information to another node device on the upstream side of the transfer route if an optical path setting is possible, or
   (a2-2) adding a second open resource information of said core node device itself to said optical path allocation packet and transferring it with the added second open resource information to said another node device if an optical path setting is impossible; and (2) an optical path switching means for
   (c1) controlling said optical switch according to the determination of the possibility of the optical path setting by said optical path allocation packet processing means to set, if the optical path setting is possible, said optical path which does not go through said router in said core node device relating to said first open resource information.

12. A node device which is used in an optical network system for transferring a user packet, which is input to said optical network system from outside said optical network system, to outside said optical network system through a plurality of said node devices, which are sequentially provided from an upstream side to a downstream side of a transfer route and which function as a transmission side edge node device, a core node device, and a destination side edge node device, respectively, the node device comprising:

a router, an optical switch; and a node control device that may function as one of said transmission side edge node device, said core node device, and said destination side edge node device, said node control device comprising;

(1) an optical path allocation packet processing means for
   (a1) transferring a first open resource information of said node control device as an optical path allocation packet to said destination side edge node device through said core node device on the downstream side of the transfer route, when said node control device functions as said transmission edge node device, and
   (a2) determining the possibility of setting an optical path in said core node device relating to said first open resource information presented in said optical path allocation packet received from said transmission side edge node device on the upstream side of the transfer route when said node control device functions as said core node device, thereby
   (a2-1) if an optical path setting is possible, adding an optical path set table information to said optical path allocation packet and transferring it with the added set table information to another node control device on the downstream side of the transfer route, or
   (a2-2) if an optical path setting is impossible, adding a second open resource information of said core node device itself to said optical path allocation packet and transferring it with the added second open resource information to said another node control device; and (2) an optical path switching means for
  (c1) controlling said optical switch according to the determination of the possibility of the optical path setting by said optical path allocation packet processing means to set, if the optical path setting is possible, said optical path which does not go through said router in said core node device relating to said first open resource information.

13. An optical path setting method for an optical network system for transferring a user packet, which is input from outside said optical network system, to outside said optical network system through a plurality of node devices, which are sequentially provided from an upstream side to a downstream side of a transfer route and which function as a transmission side edge node device, a core node device, and a destination side edge node device, respectively, each of said node devices comprising a router, an optical switch, and a node control device, and said node control device including an optical path allocation request packet processing means, an optical path allocation packet processing means, and an optical path switching means and being capable of functioning as one of said transmission side edge node device, said core node device, and said destination side edge node device, the method comprising the steps of:

(1) transferring a first open resource information of said node device functioning as said destination side edge node device as an optical path allocation request packet to said transmission side edge node device through said core node device on the upstream side of the transfer route under the control of said optical path allocation request packet processing means;

(2) adding a second open resource information of said node device functioning as said core node device to said optical path allocation request packet received from said destination side edge device on the downstream side of the transfer route and transferring the first and second open resource information to another node device on the upstream side of the transfer route under the control of said optical path allocation request processing means in said core node device;

(3) selecting open resource information capable of determining the allocation of an optical path, which can pass through said core node device without going through the router therein, based on said first and second open resource information received from said core node device on the downstream side of the transfer route with said transmission side edge node device, under the control of said optical allocation packet processing means in said core node device;

(4) notifying the allocation of the optical path to said core node device relating to the selected open resource information, using an optical path allocation packet, with said transmission side edge node device, under the control of said optical allocation said core node device;

(5) controlling said optical switch according to the notified optical path allocation packet to set said optical path which does not go through said router with said core node device, under the control of said optical path switching means in said core node device, and (6) outputting an optical path setting completion notice packet to notify the completion of the optical path setting to said transmission side edge node device with said core node device, under the control of said optical path switching means in said core node device.

14. An optical path setting method according to claim 13, further comprising forcibly releasing the optical path when a predetermined time has elapsed since the setting of the optical path, or when a decrease in a number of communication packets is confirmed at a node device positioned at both ends of the optical path.

15. The optical path setting method according to claim 13, further comprising:
  determining whether an information channel is continuously insured after setting the optical path between node devices on the transfer route where the optical path is set before setting the optical path; and
  setting the optical path only when the information channel is insured.

16. The optical path setting method according to claim 13, further comprising:
  outputting a user packet read from a destination-based buffer provided between said router and said optical switch.

17. The optical path setting method according to claim 13, further comprising:
  communication between node devices where the optical path is set by using optical signals with a fixed wavelength insured for the information channel after the optical path is set.

18. An optical path setting method for an optical network system for transferring a user packet, which is input from outside said optical network system, to outside said optical network system through a plurality of node devices, which are sequentially provided from an upstream side to a downstream side of a transfer route and which function as a transmission side edge node device, a core node device, and a destination side edge node device, respectively, each of said node devices comprising a router, an optical switch, and a node control device, and said node control device including an optical path allocation request packet processing means, an optical path allocation packet processing means, and an optical path switching means and being capable of functioning as one of said transmission side edge node device, said core node device, and said destination side edge node device, the method comprising the steps of:

(1) transferring a first open resource information of said transmission side edge node device as an optical path allocation request packet to said side destination edge node device through said core node device on the downstream side of the transfer route with said transmission side edge node device, under the control of said optical path allocation request packet processing means in said transmission side edge node device;

(2) adding a second open resource information of said core node device to said optical path allocation request packet received from said transmission side edge node device to the upstream side of the transfer route and transferring the first and second open resource information to another node device on the downstream side of the transfer route with said core node device, under the control of said optical path allocation request processing means in said core node device;

(3) selecting open resource information capable of determining the allocation of an optical path, which can pass through said core node device without going through the router therein, based on said first and second open resource information received from said core node device on the upstream side of the transfer route with said destination side edge node device, under the control of said optical path allocation packet processing means in said destination side edge node device;

(4) notifying the allocation of the optical path to said core node device relating to the selected open resource information, using an optical path allocation packet with said destination side edge node device, under the control of said optical path allocation packet processing means in said destination side edge node device;

(5) controlling said optical switch according to the notified optical path allocation packet to set said optical path which does not go through said router when said node device functions as said core node device with said destination side edge node device, under the control of said optical path switching means in said core node device; and (6) outputting an optical path setting completion notice packet to notify the completion of the optical path setting to said transmission side edge node device with said destination side edge node device, under the control of said optical path switching means in said core node device.

19. An optical path setting method for an optical network system for transferring a user packet, which is input from outside said optical network system, to outside said optical network system through a plurality of said node devices, which are sequentially provided from an upstream side to a downstream side of a transfer route and which functions as a transmission side edge node device, a core node device, and a destination side edge node device, respectively, each of said node devices comprising a router, an optical switch, and a node control device, and said node control device including an optical path allocation packet processing means, and an optical path switching means and being capable of functioning as one of said transmission side edge node device, said core node device, and said destination side edge node device, the method comprising the steps of:

(1) transferring a first open resource information of said destination side edge node device as an optical path allocation packet to said transmission side edge node device through said core node device on the upstream side of the transfer route with said destination side edge node device, under the control of said optical path allocation packet processing means in said destination side edge node device, and (2) determining the possibility of setting an optical path in said core node device relating to said first open resource information presented in said optical path allocation packet received from said destination side edge node device on the downstream side of the transfer route with said core node device, under the control of said optical path allocation packet processing means in said core node device, thereby (a1) adding an optical path set table information to said optical path allocation packet and transferring it with the added set table information to another node device on the upstream side of the transfer route if an optical path setting is possible, or (a2) adding a second open resource information of said core node device to said optical path allocation packet and transferring it with the added second open resource information to said another node device if an optical path setting is impossible.

20. An optical path setting method for an optical network system for transferring a user packet, which is input from outside said optical network system, to outside said optical network system through a plurality of said node devices, which are sequentially provided from an upstream side to a downstream side of a transfer route and which function as a transmission side edge node device, a core node device, and a destination side edge node device, respectively, each of said node devices comprising a router, an optical switch, and a node control device; and said node control device including an optical path allocation packet processing means and being capable of functioning as one of said transmission side edge node device, said core node device, and said destination side edge node device, the method comprising the steps of:

(1) transferring a first open resource information of said transmission side edge node device as an optical path allocation packet to said destination side edge node device through said core node device on the upstream side of the transfer route with said transmission side edge node device, under the control of said optical path allocation packet processing means in said transmission side edge node, and (2) determining the possibility of setting an optical path in said core node device relating to said first open resource information presented in said optical path allocation packet received from said transmission side edge node device on the upstream side of the transfer route with said core node device, under the control of said optical path allocation packet processing means, thereby (a1) adding an optical path set table information to said optical path allocation packet and transferring it with the added set table information to another node device on the downstream side of the transfer route if an optical path setting is possible, or (a2) adding a second open resource information of said core node device itself to said optical path allocation packet and transferring it with the added second open resource information to said another node device if an optical path setting is possible.

* * * * *